(12) United States Patent
Ando et al.

(10) Patent No.: US 6,471,011 B1
(45) Date of Patent: Oct. 29, 2002

(54) ELEVATOR COMMUNICATION CONTROLLER AND COMMUNICATION CONTROL METHOD

(75) Inventors: Hiroshi Ando, Tokyo (JP); Kunikazu Koura, Tokyo (JP); Hiroshi Gokan, Tokyo (JP); Nobukazu Takeuchi, Tokyo (JP); Shougo Tatsumi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/959,603

(22) PCT Filed: Mar. 30, 2000

(86) PCT No.: PCT/JP00/02030

§ 371 (c)(1),
(2), (4) Date: Oct. 31, 2001

(87) PCT Pub. No.: WO01/74702

PCT Pub. Date: Oct. 11, 2001

(51) Int. Cl.⁷ .................................................. B66B 1/18
(52) U.S. Cl. ...................................... 187/247; 187/382
(58) Field of Search .............................. 187/247, 248, 187/380, 382, 384, 385, 387, 388, 391, 393, 277; 700/3, 20, 21, 27; 340/3.1, 3.5, 3.52, 7.46, 7.47; 709/208, 211, 238, 245; 710/110

(56) References Cited

U.S. PATENT DOCUMENTS

| | | | | |
|---|---|---|---|---|
| 4,082,164 A | * | 4/1978 | Sackin et al. ................ | 187/387 |
| 4,567,560 A | * | 1/1986 | Polis et al. .................. | 187/248 |
| 4,709,788 A | * | 12/1987 | Harada ........................ | 187/382 |
| 5,012,899 A | * | 5/1991 | Iwata ........................... | 187/277 |
| 5,019,960 A | * | 5/1991 | Ando et al. .................. | 187/277 |
| 5,023,871 A | | 6/1991 | Nakayashiki et al. | |
| 5,398,782 A | * | 3/1995 | Talbot et al. ................ | 187/247 |
| 5,654,531 A | * | 8/1997 | Farabee et al. .............. | 187/247 |
| 5,804,778 A | * | 9/1998 | Chen et al. .................. | 187/248 |
| 5,884,729 A | | 3/1999 | Park et al. | |
| 5,936,211 A | * | 8/1999 | Kim ............................. | 187/248 |
| 6,349,795 B1 | * | 2/2002 | Tatsumi et al. .............. | 187/247 |

FOREIGN PATENT DOCUMENTS

| | | |
|---|---|---|
| JP | 61-188376 | 8/1986 |
| JP | 61-295979 | 12/1986 |
| JP | 62-116483 | 5/1987 |
| JP | 6-80322 | 3/1994 |
| JP | 6-152604 | 5/1994 |
| JP | 7-30564 | 1/1995 |
| JP | 8-88641 | 4/1996 |

\* cited by examiner

*Primary Examiner*—Jonathan Salata
(74) *Attorney, Agent, or Firm*—Leydig, Voit & Mayer, Ltd.

(57) ABSTRACT

A cmmunications control system for elevators having control units including at least respective car control units and elevator hall registration control units, each of the control units having a node, the nodes being connected to each other via a network, and each of the nodes having a management table establishing correspondence between node number and network address. The elevator communications control system includes a node acting as a master when a first network address corresponding to the node number of this node is, upon referring to the management table, a specific address in the management table, and sending to all other nodes a broadcast communication to notify that the node is a temporary master having the first network address added and receives from another temporary master a broadcast communication for notifying that this other node is the temporary master having a second network address corresponding to the node number of the other temporary master added, if the first network address and the second network address conform to specific conditions.

18 Claims, 15 Drawing Sheets

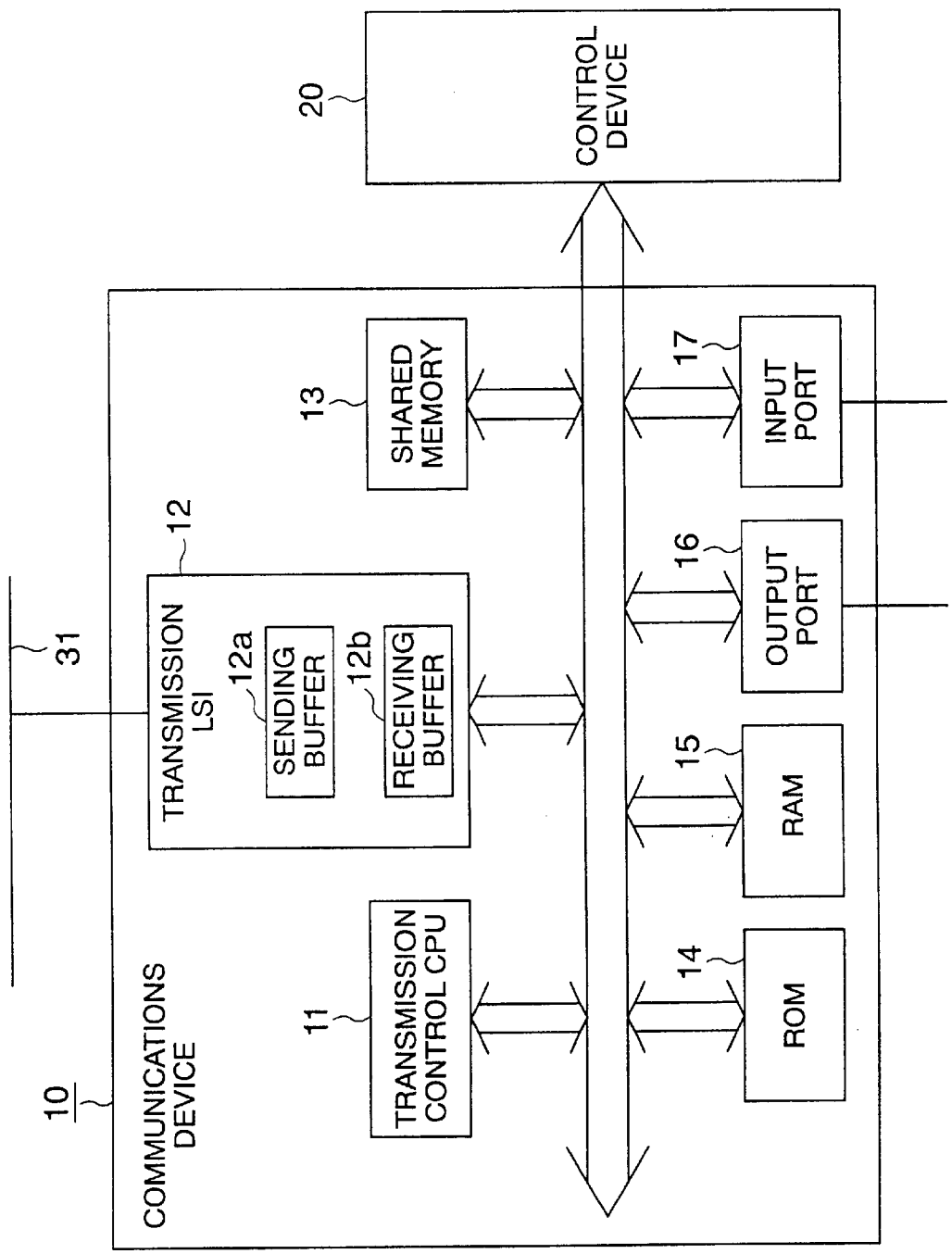

FIG. 3

| ALIVE/DEAD IDENTIFIER | MASTER/ SLAVE | POSITION | ATTRIBUTE | NODE NUMBER #1 | LOGICAL NETWORK ADDRESS | PHYSICAL NETWORK ADDRESS |
|---|---|---|---|---|---|---|
| ALIVE/DEAD IDENTIFIER | MASTER/ SLAVE | POSITION | ATTRIBUTE | NODE NUMBER #2 | LOGICAL NETWORK ADDRESS | PHYSICAL NETWORK ADDRESS |
| ALIVE/DEAD IDENTIFIER | MASTER/ SLAVE | POSITION | ATTRIBUTE | NODE NUMBER #3 | LOGICAL NETWORK ADDRESS | PHYSICAL NETWORK ADDRESS |
| ALIVE/DEAD IDENTIFIER | MASTER/ SLAVE | POSITION | ATTRIBUTE | NODE NUMBER #4 | LOGICAL NETWORK ADDRESS | PHYSICAL NETWORK ADDRESS |
| ALIVE/DEAD IDENTIFIER | MASTER/ SLAVE | POSITION | ATTRIBUTE | NODE NUMBER #5 | LOGICAL NETWORK ADDRESS | PHYSICAL NETWORK ADDRESS |
| ALIVE/DEAD IDENTIFIER | MASTER/ SLAVE | POSITION | ATTRIBUTE | NODE NUMBER #6 | LOGICAL NETWORK ADDRESS | PHYSICAL NETWORK ADDRESS |
| ALIVE/DEAD IDENTIFIER | MASTER/ SLAVE | POSITION | ATTRIBUTE | NODE NUMBER #7 | LOGICAL NETWORK ADDRESS | PHYSICAL NETWORK ADDRESS |
| ... | ... | ... | ... | ... | ... | ... |
| ALIVE/DEAD IDENTIFIER | MASTER/ SLAVE | POSITION | ATTRIBUTE | NODE NUMBER #n | LOGICAL NETWORK ADDRESS | PHYSICAL NETWORK ADDRESS |

FIG. 5

| SET VALUE (EXPRESSED AS A BINARY NUMBER) COMPRISING A 6-BYTE CONSTRUCTION | EXPLANATION |
|---|---|
| 1111 1111  1111 1111  1111 1111  1111 1111  1111 1111  1111 1111 | BROADCAST PACKET (BROADCAST COMMUNICATION) |
| xxxx xxx1  0000 0000  0000 0000  0000 0000  0000 0000  0000 0000<br>xxxx xxx A NUMBER OF A SPECIFIC DISTRIBUTION GROUP NUMBER IS SPECIFIED FOR THESE 7 BITS AND THIS BECOMES AN IDENTIFICATION NUMBER FOR A DISTRIBUTION GROUP DESTINATION | MULTI-CAST PACKET (PARTIAL BROADCAST COMMUNICATION) (SENT OUT SEPARATELY BY POSITION GROUP) |
| 0000 0000  xxxx xxxx  xxxx xxxx  xxxx xxxx  xxxx xxxx  xxxx xxxx<br>xxxx···xxxx A NUMERAL OF A SPECIFIC DISTRIBUTION GROUP NUMBER IS SPECIFIED FOR THESE 40 BITS AND THIS BECOMES AN IDENTIFICATION NUMBER FOR A PHYSICAL NETWORK ADDRESS | UNION CAST PACKET (ONE-TO-ONE COMMUNICATION) |

FIG. 6

| SET VALUE (EXPRESSED AS A BINARY NUMBER) | EXPLANATION |
|---|---|
| 0001 | APPLICATION LAYER DATA PACKET |
| ... | PREPARATION |
| 1100 | DATA LINK LAYER DATA PACKET (MANAGEMENT TABLE DISTRIBUTION, ETC.) |
| 1101 | SYNCHRONIZATION START DATA PACKET |
| 1111 | SYNCHRONIZATION RESPONSE DATA PACKET |
| 1110 | SYNCHRONIZATION COMPLETION DATA PACKET |
| ... | PREPARATION |

FIG. 7

| SET VALUE (EXPRESSED AS A BINARY NUMBER) | EXPLANATION |
|---|---|
| 00 | NO REQUEST |
| 01 | EXCESS DATA COMMUNICATION APPROVAL (FROM MASTER AT TIME OF SLAVE COMMUNICATION) |
| 10 | EXCESS DATA COMMUNICATION REQUEST (FROM SLAVE AT TIME OF MASTER COMMUNICATION) |
| 11 | INVALID |

ELEVATOR COMMUNICATION CONTROLLER AND COMMUNICATION CONTROL METHOD

TECHNICAL FIELD

The present invention pertains to operation management of a plurality of elevators installed inside a building, and particularly a communications control system and communications control method for elevators, shortening both the time that an elevator passenger waits to board an elevator and the time of waiting until arrival at a desired destination floor, and resistant to failure.

BACKGROUND ART

Explanation is made of a conventional communications control system for elevators, making reference to the drawings. FIG. 16 is a diagram showing a construction of the conventional communications control system for elevators shown in Japanese Patent Laid-Open 6-080322, for example.

In this conventional communications control system for elevators, as shown in FIG. 16, three sets of control units 91, 92 and 93 for controlling three elevators are provided as an example.

Each control unit 91, 92 and 93 has car control units CCa, CCb and CCc for controlling its own elevator, and additionally, each control unit 91, 92 and 93 is integrally provided with group management control processing group control units GCa, GCb and GCc, being made compact for distributed processing, and hall call control processing hall control units HCa, HCb and HCc.

Each control unit 91, 92 and 93 also has a transmission LSI (Large Scale Integrated circuit)Sa, Sb, and Sc, respectively, and information outputted from here is transmitted via a bus-form high-speed transmission line 94.

On the hall side, in correspondence to the 2-series construction of the present example, there is provided for each series of each hall, a hall controller 95 comprising a one-chip microcomputer (one-chip micon). Each hall controller 95 is expressed by a reference numeral S followed by a numeral (1 or 2) which indicates a series type and a numeral (1–m) which indicates a hall type. For example, the hall controller 95 on the series 1 side at floor m is specified as S1m.

These hall controllers 95 perform input processing of a hall call registration signal from a hall call registration button 96 and output processing of a lighting signal for a hall call registration lamp 97. Further, these hall controllers 95 are connected per series and in a parallel fashion to master nodes CPU Ma, Mb and Mc of each control unit 91, 92, and 93 via transmission lines 98, 99.

One from among the plurality of control units 91–93 is made to be a main node for performing processing of dividing up work among each elevator and achieving synchronization among the control units therein, and the other control units are made to be subnodes for obeying the main unit. For control functions requiring real time processing, synchronized control processing of the control units of all the series is performed from the main unit. For control functions requiring cyclic processing, the control processing is processed by dividing them among the control units of each series.

The conventional communications control system for elevators described above had a problem that synchronization commands of the cyclic processing caused a useless processing burden on sub-nodes that were clearly not related to the given communication.

Further, in the case of the conventional communications control system for elevators described above, there was a problem that when a method was used such that the sub-node side detected collisions of transmissions and staggered transmission times, when there were ten-plus sub units, the sub side presumed that answer collisions would occur, and in order to receive all answers, the waiting times of the main unit became widely varied. Transmission of large amounts of faulty data generated with the answer collisions caused the network to be weighed down with useless traffic.

Further, in the case of the communications control system for elevators described above, there was a problem that while a given network is waiting for a given cyclic process to be performed, that network has no data to communicate and is in an idle state.

Further, in the case of the communications control system for elevators described above, when the control unit that is made to be the main node is down for a given period of time, resuming of communications is achieved by a method such that the first control unit, from among the remaining control units to achieve control of the transmission line, is made to be the new master, and communications are resumed. This seems reasonable at first glance; however, the sending out of data in order to become the main node becomes more complicated the more sub-nodes there are, and data collisions on the network are expected due to a plurality of such data communication taking place simultaneously. It is difficult to be sure that correct data communication/receiving will be performed at all the nodes, and moreover, there is a possibility that a single main node might not be present or two or more nodes might become main nodes simultaneously and send out synchronization commands separately. When time was apportioned for restoring failures, there was a possibility that serious trouble may be caused in the operation of an elevator, which handles human life.

The present invention was developed to solve the above-mention problems. Therefore, an objective of the present invention is to obtain a communications control system for elevators and communications control method in which the synchronization commands do not cause data receiving burdens on all the nodes; the possibility of collisions at the nodes upon sending out data is made as minimal as possible; the network is not idling but is capable of working even during data processing at each node; and even in the case when the main node is down due to some cause, a new main node resumes data communication/receiving within extremely short period of time; and, as a result, the operation management of the Plurality of elevators installed inside the building can be conducted in such a way that both the time that an elevator passenger waits to board an elevator and the time of waiting until arrival at a desired destination floor may be reduced, and, further, the communications central system is resistant to failure.

DISCLOSURE OF THE INVENTION

A communications control system for elevators according to the present invention has a plurality of control units including at least respective car control units and elevator hall registration control units, each of the plurality of control units having a node, the plurality of nodes being connected to each other via a network, and each of the node having a management table establishing correspondence between a node number and a network address, wherein the communications control system for elevators comprises a node that acts as a master when, in a case where a first network address corresponding to the node number of this node is, upon referring to the management table, a specific address in the management table, this node sends to all other nodes a broadcast communication to notify that this node is a temporary master having the, first network address added thereto and receives from another temporary master a broadcast communication stating that this other node is the temporary master having a second network address corresponding to the node number of this other temporary master added thereto, if the fist network address and the second network address conform to specific conditions; and a node that acts as a slave when, in a case where the network address corresponding to the node number of this node is not a specific address in the management table or the first network address corresponding to the node number of this node is a specific address in the management table upon referring to the management table, this node sends to all other nodes a broadcast communication to notify that this node is a temporary master having the first network address added thereto and receives from another temporary master a broadcast communication stating that this other node is the temporary master having a second network address corresponding to the node number of this other temporary master added thereto, if the first network address and the second network address do not conform to specific conditions.

In the communications control system for elevators according to the present invention, the node acting as the slave acts as a quasi-master when, in a case where it does not receive synchronization start data from the node acting as the master within a predetermined amount of time and, upon referring to the management table, a third network address corresponding to its node number is a second specific address in the management table, the node sends to all other nodes a broadcast communication to notify that this node is a temporary master having the third network address added thereto and receives from another temporary master a broadcast communication for notifying that this other node is the temporary master having a fourth network address corresponding to the node number of the other temporary master added thereto, if this third and fourth network addresses conform to specific conditions; and the node acting as a slave acts as a slave once again in a case when the node references the management table and the third network address corresponding to its node number is not the second specific address in the management table and a broadcast communication is received from a node acting as the quasi-master stating this node acting as the quasi-master is the temporary master within the predetermined amount of time.

In the communications control system for elevators according to the present invention, in the case when the node acting as the slave detects that the master and the quasimaster do not exist, this node acting as the slave sends to the other nodes by means of a broadcast communication a management table rebuild request data having the management table data currently held by the node added thereto, and changes over to an operation for determining the master upon rebuilding the management table based on the management table rebuild request data received from another node.

In the communications control system for elevators according to the present invention, the master sends a first synchronization start data to a first slave among a plurality of slaves; upon receiving synchronization completion data from a previous slave sends subsequent synchronization start data to a subsequent slave in sequence; upon receiving the synchronization completion data from a last slave from among the plurality of slaves completes one cycle of synchronization communication, and also, measures the one cycle of the synchronization communication as a synchronization communication cycle time, and measures a duration between the sending of the synchronization start data to each slave as a synchronization communication node allocated time, thus managing the communication; and the each slave upon receiving the synchronization start data from the master sends data to another node; and upon completing the sending of the data sends synchronization completion data to the master.

In the communications control system for elevators according to the present invention, each slave puts data that it needs to communicate into a sending buffer in advance before receiving the synchronization start data from the master.

In the communications control system for elevators according to the present invention, the master measures a time duration of one cycle of the synchronization communication for a particular slave, and when this measured synchronization communication cycle time is less than a target synchronization communication cycle time the master adds an allocated time to the synchronization start data in a later synchronization communication with that particular slave and communicates the same, the allocated time being a differential of the measured synchronization communication cycle time and the target synchronization communication cycle time; and the particular slave upon receiving the synchronization start data from the master communicates excess data to another node separately from the normal data communication based on the allocated time.

In the communications control system for elevators according to the present invention, the slave measures a time duration of one cycle of its own synchronization communication, and when this measured synchronization communication cycle time is less than a target synchronization communication cycle time the slave adds an allocated time to a synchronization response data in a later synchronization communication with the master and communicates the same, the allocated time being a differential of the measured synchronization communication cycle time and the target synchronization communication cycle time; and the slave communicates excess data to another node separately from the normal data communication based on the allocated time; and the master upon receiving the synchronization response data from the slave controls the synchronization communication based on the allocated time.

In the communications control system for elevators according to the present invention having a plurality of control units including at least respective car control units and elevator hall registration control units, each of the control units having a node, the plurality of nodes being mutually connected via a network as a single master and a plurality of slaves, and each of the node having a management table establishing correspondence between a node number and a network address, the master communicates a first synchronization start data to a first slave among a plurality of slaves; upon receiving synchronization completion data from a previous slave sends subsequent synchronization start data to a subsequent slave in sequence; upon receiving the synchronization completion data from a last slave from among the plurality of slaves completes one cycle of synchronization communication, and also, measures the one cycle of the synchronization communication as a synchronization communication cycle time, and measures a duration between the sending of the synchronization start data to each slave as a synchronization communication node allocated time, thus managing the communication; and in which each slave upon receiving the synchronization start data from the master sends data to another node; and upon completing the sending of the data communicates synchronization completion data to the master.

In the communications control system for elevators according to the present invention, each slave puts data that it needs to communicate into a sending buffer in advance before receiving the synchronization start data from the master.

In the communications control system for elevators according to the present invention, the master measures a time duration of one cycle of the synchronization communication for a particular slave, and when this measured synchronization communication cycle time is less than a target synchronization communication cycle time the master adds an allocated time to the synchronization start data in a later synchronization communication with that particular slave and communicates the same, the allocated time being a differential of the measured synchronization communication cycle time and the target synchronization communication cycle time; and the particular slave upon receiving the synchronization start data from the master communicates excess data to another node separately from the normal data communication based on the allocated time.

In the communications control system for elevators according to the present invention, the slave measures a time duration of one cycle of its own synchronization communication, and when this measured synchronization communication cycle time is less than a target synchronization communication cycle time the slave adds an allocated time to a synchronization response data in a later synchronization communication with the master and communicates the same, the allocated time being a differential of the measured synchronization communication cycle time and the target synchronization communication cycle time, and the slave communicates excess data to another node separately from the normal data communication based on the allocated time; and the master upon receiving the synchronization response data from the slave controls the synchronization communication based on the allocated time.

In the communications control method for elevators according to the present invention having a plurality of control units including at least respective car control units and elevator hall registration control units, each of the control units having a node, the plurality of nodes being mutually connected via a network, and each of the node having a management table establishing correspondence between a node number and a network address, the communications control method comprises a node acting as a master when, in the case where a first network address corresponding to the node number of this node is, upon referring to the management table, a specific address in the management table, this node sends to all other nodes a broadcast communication to notify that this node is a temporary master having the first network address added thereto and receives from another temporary master a broadcast communication for notifying that this other node is the temporary master having a second network address corresponding to the node number of this other temporary master added thereto, if the first network address and the second network address conform to specific conditions; an a node acting as a slave when, in a case where the network address corresponding to the node number of this node is not a specific address in the management table or the first network address corresponding to the node number of this node is a specific address in the management table upon referring to the management table, this node sends to all other nodes a broadcast communication to notify that this node is a temporary master having the first network address added thereto and receives from another temporary master a broadcast communication for notifying that this other node is the temporary master having a second network address corresponding to the node number of this other temporary master added thereto, if the first network address and the second network address do not conform to specific conditions.

In the communications control method for elevators according to the present invention, with a node acting as the slave, the node acting as the slave acts as a quasi-master when, in a case where it does not receive synchronization start data from the node acting as the master within a predetermined amount of time and, upon referring to the management table, a third network address corresponding to its node number is a second specific address in the management table, the node sends to all other nodes a broadcast communication to notify that this node is a temporary master having the third network address added thereto and receives from another temporary master a broadcast communication for notifying that this other node is the temporary master having a fourth network address corresponding to the node number of the other temporary master added thereto, if this third and fourth network addresses conform to specific conditions; and the node acting as a slave acts as a slave once again in a case when the node references the management table and the third network address corresponding to its node number is not the second specific address in the management table and a broadcast communication is received from a node acting as the quasi-master stating this node acting as the quasi-master is the temporary master within the predetermined amount of time.

In the communications control method for elevators according to the present invention, with the node acting as the slave, in the case when the node acting as the slave detects that the master and the quasi-master do not exist, this node acting as the slave sends to the other nodes by means of a broadcast communication a management table rebuild request data having the management table data currently held by the node added thereto, and changes over to an operation for determining the master upon rebuilding the management table based on the management table rebuild request data received from another node.

The communications control method for elevators according to the present invention, further comprises the master sending a first synchronization start data to a first slave among a plurality of slaves; upon receiving synchronization completion data from a previous slave sending a subsequent synchronization start data to a subsequent slave in sequence; upon receiving the synchronization completion data from a last slave from among the plurality of slaves completing one cycle of synchronization communication, and also, measuring the one cycle of the synchronization communication as a synchronization communication cycle time, and measuring a duration between the sending of the synchronization start data to each slave as a synchronization communication node allocated time, thus managing the communication; and each slave upon receiving the synchronization start data from the master sending data to another node; and upon completing the communication of the data communicating synchronization completion data to the master.

In the communications control method for elevators according to the present invention, with each slave operating, each slave puts data that it needs to send into a sending buffer in advance before receiving the synchronization start data from the master.

In the communications control method for elevators according to the present invention, the master operating, the master measures a time duration of one cycle of the synchronization communication for a particular slave, and when this measured synchronization communication cycle time is less than a target synchronization communication cycle time the master adds an allocated time to the synchronization data in a later synchronization communication with that particular slave and communicates the same, the allocated time being a differential of the measured synchronization communication cycle time and the target synchronization communication cycle time; and in the step of each slave operating, the particular slave upon receiving the synchronization start data from the master sends excess data to another node separately from the normal data communication based on the allocated time.

In the communications control method for elevators according to the present invention, with each slave operating, the slave measures a time duration of one cycle of its own synchronization communication, and when this measured synchronization communication cycle time is less than a target synchronization communication cycle time the slave adds an allocated time to a synchronization response data in a later synchronization communication with the master and sends the same, the allocated time being a differential of the measured synchronization communication cycle time and the target synchronization communication cycle time; and the slave sends excess data to another node separately from the normal data communication based on the allocated time; and in the step of the master operating, the master upon receiving the synchronization response data from the slave controls the synchronization communication based on the allocated time.

BRIEF DESCRIPTION OF THE DRAWINGS

In the accompanying drawings:

FIG. 2 is a diagram depicting a construction of a communication device in the communications control system for elevators according to Embodiment 1 of the present invention;

FIG. 3 is a diagram depicting a network address management table;

FIG. 5 is a diagram depicting one example of a "Communication destination physical network address" field in the packet data;

FIG. 6 is a diagram showing one example of a "Data type" field in the packet data;

FIG. 7 is a diagram showing one example of an "Excess data communication request/communication approval header" field in the packet data;

BEST MODE FOR CARRYING OUT THE INVENTION

Hereinafter, explanation is made of each embodiment of the present invention, making reference to the drawings.

Embodiment 1

Figure 1:
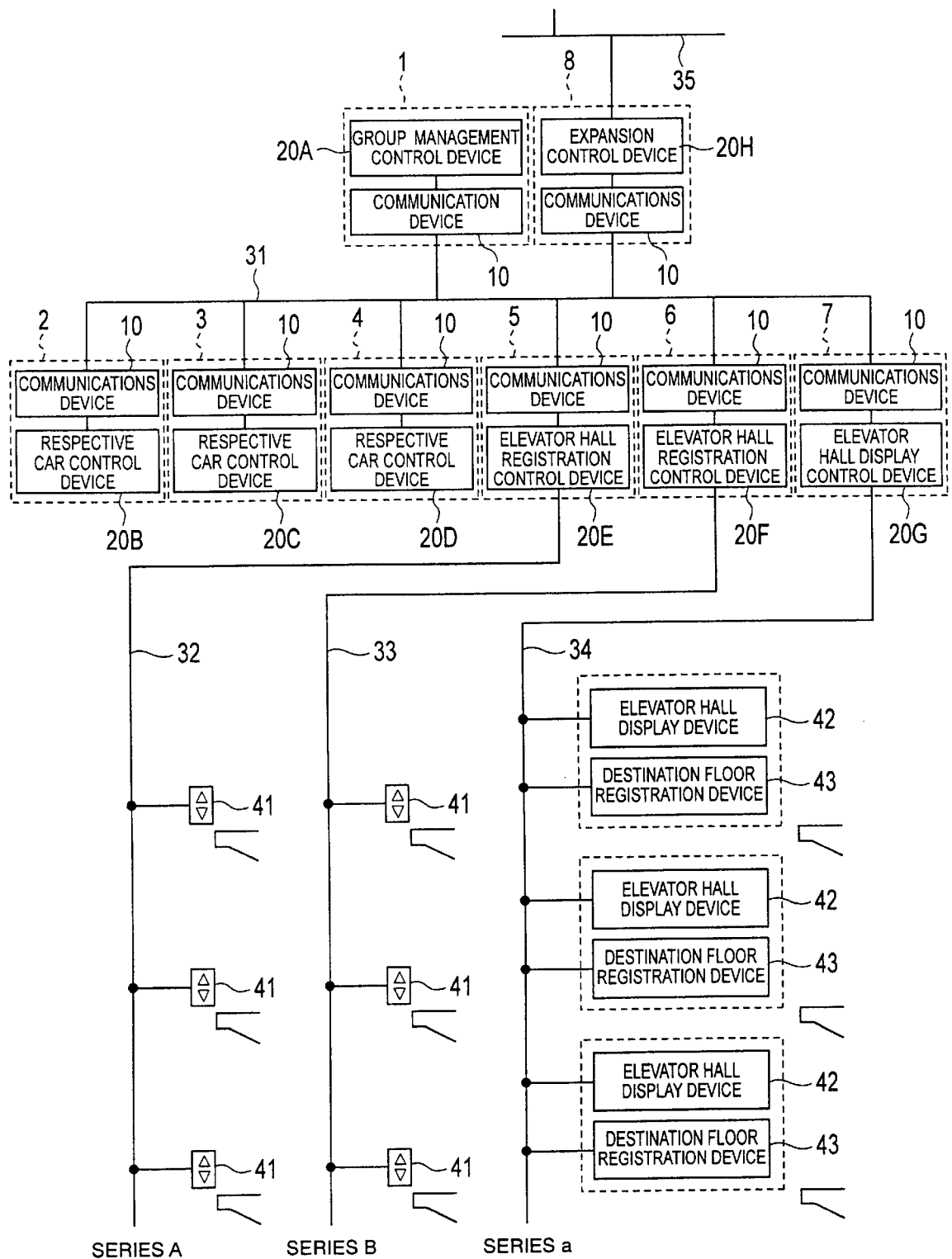
FIG. 1 is a diagram depicting a construction of a communications control system for elevators according to Embodiment 1 of the present invention.

Explanation is made of a communications control system for elevators according to Embodiment 1 of the present invention, making reference to the drawings. FIG. 1 is a diagram showing a construction of the communications control system for elevators according to Embodiment 1 of the present invention. Note that in the drawings the same reference numerals indicate the same or corresponding parts.

In FIG. 1, the communications control system for elevators is equipped with: a group management control unit 1; a respective car control unit 2; a respective car control unit 3; a respective car control unit 4; an elevator hall registration control unit 5; an elevator hall registration control unit 6; an elevator hall display control unit 7; and an expansion control unit 8, which are connected to each other via a transmission line 31.

Further, in the same diagram, the group management control unit 1 has a communications device 10 and a group management control device 20A. This group management control unit 1 performs an allocation control of an elevator car (not shown) in response to a registered elevator hall call based on an elevator hall call registration signal.

Further, in the same diagram the respective car control unit 2 has the communications device 10 and a respective car control device 20B. This respective car control unit 2 controls a car allocation signal against an elevator hall call registration signal from the group management control unit 1, and controls ascending and descending of the elevator based on a car call signal from a car.

Similarly, the respective car control unit 3 has the communications device 10 and a respective car control device 20C, and the respective car unit 4 has the communications device 10 and a respective car control device 20D. These respective car control units 3 and 4 have the same functions as those of the respective car control unit 2. Note that, in the present example the respective car control units 2, 3 and 4 and a car apparatus are joined by means of the transmission line, although this is not shown in the diagram.

Further, in the same diagram, the elevator hall registration control unit 5 has the communications device 10 and an elevator hall registration control device 20E. This elevator hall registration control unit 5 controls, via the transmission line 32, input processing of the elevator hall call registration signal from an elevator hall button registration device 41 installed on each floor, and output processing of an elevator hall registration light signal from the group management control unit 1 responding to the elevator hall call. Note that in this example the elevator hall registration control unit 5 uses the elevator hall call registration information of the three elevators of series A controlled by the respective car control units 2 to 4, and the elevator hall registration light information.

Similarly, the elevator hall registration control unit 6 has the communications device 10 and an elevator hall registration control device 20F. This elevator hall registration control unit 6 has the same functions as the functions of the elevator hall registration control unit 5. Note that in this example the elevator hall registration control unit 6 handles the elevator hall call registration information of the three elevators of series B controlled by the respective car control units 2 to 5, and the elevator hall registration light information.

Further, in the same diagram an elevator hall display control unit 7 has the communications device 10 and an elevator hall display control device 20G. This elevator hall display control unit 7 controls, via a transmission line 34, input processing of a destination floor registration signal originating from a destination floor registration device 43 installed at the elevator hall, and output processing of the car allocation signal and a destination floor registration light signal responding to a destination floor registration signal originating from the group management control unit 1. Note that, in this example the elevator hall display control unit 7 handles the destination floor registration information, the destination floor registration light information, and the like, of the three elevators controlled by the respective car control units 2 to 4.

An elevator hall display device 42 installed on each floor performs display control of actual display, for example, of serial numbers of allocated cars, based on the car allocation signal originating from the elevator hall display control unit 7.

The destination floor registration device 43 installed on each floor performs input processing of an ON/OFF contact point signal originating from the destination registration button, and control of actual turning on and turning off based on the destination registration light signal originating from the elevator hall display control unit 7.

Further, in FIG. 1 the expansion control unit 8 has the communications device 10 and an expansion control device 20H. This expansion control unit 8 is mutually joined with another network via a transmission line 35, and performs a bridge function for joining with a group management communications control system of another elevator. Further, the expansion control unit 8 is connected via the transmission line 35 to a personal computer installed in a management room, and this personal computer monitors a plurality of elevator group management communications control systems provided throughout the building.

Note that, the series A in FIG. 1 indicates an elevator hall a call registration signal and an elevator hall registration light signal for general use (non-handicapped passengers), and the series B indicates the same being, for example, for handicapped passengers. Further, a series a indicates destination floor registration information for use for a specific floor.

Next, explanation is made of a detailed construction of the communications device of each control unit, making reference to the drawings. FIG. 2 is a diagram showing a construction of the communications device of each control unit of the communications control system for elevators according to Embodiment 1 of the present invention.

As shown in FIG. 2, the communications device 10 is composed of: a transmission control CPU 11 for controlling the entire communications system; a transmission LSI 12, being connected to a transmission line 31 joining each control unit, adapted to automatically check sending and receiving of transmission data, and transmission irregularity under the control of the CPU 11; a shared memory 13 constructed of, for example, a two-port RAM accessible from both the CPU 11 and a control device 20 explained below; a readable volatile memory (ROM) 14 for storing a program and a chart or charts; a readable/writeable non-volatile memory (RAM) 15 for temporarily storing data; an output port 16; and input port 17; and a multi-bus for tightly coupling the above-mentioned constituent features 11 to 17 and the control device 20.

Further, as shown in the same diagram, the transmission LSI 12 comprises a sending buffer 12a and a receiving buffer 12b.

Further, the control device 20 in FIG. 2 corresponds to each is control device 20A to 20H shown in FIG. 1.

The communication device 10 performs sending and receiving of transmission data over the transmission line 31 via the transmission LSI 12 and the multi-bus 18, which are connected to the transmission line 31. Further, the control device 20 performs exchange of data through the shared memory 13, which is tightly coupled with the control device 20 via the multi-bas 18. Furthermore, a node number or other such setting information for distinguishing between communication systems of the control units is inputted from the input port 17 from an external setting device (such as a jumper line or a rotary switch: not shown in the diagram). Output control to an external display device (for example, an LED not shown in the diagram) is performed from the output port 16.

FIG. 3 is a diagram showing a "network address management table". This table is for establishing correspondences among an "Alive/Dead Identifier", "Master/Slave", "Position", "Attribute", "Node Number", "Logical Network Address" and "Physical Network Address". This table is stored, for example, in advance in the ROM 14 of each communications device 10.

Figure 4:
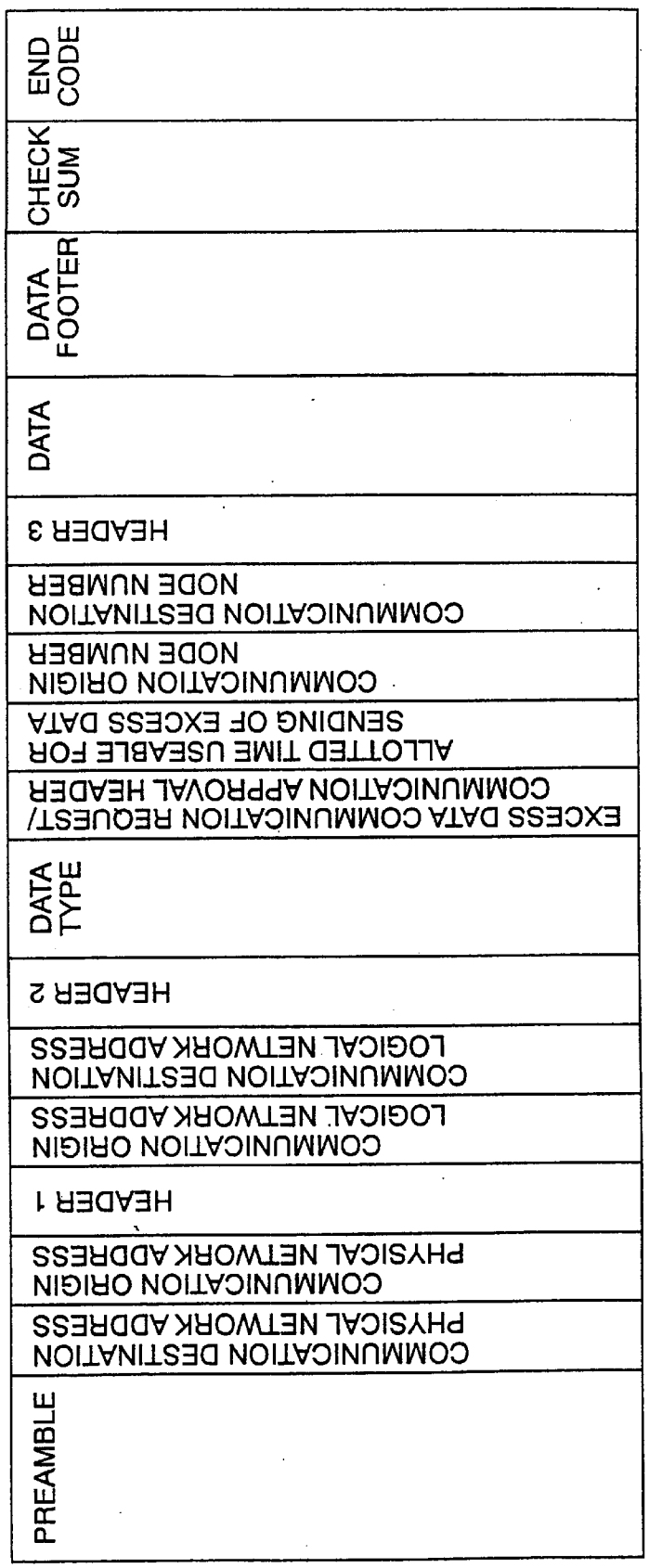
FIG. 4 is a diagram depicting a format for packet data.

FIG. 4 is a diagram showing a packet data format. This packet data format is constructed of the following fields: "Preamble"; "Communication destination physical network address"; "Communication origin physical network address"; "Header 1"; "Communication origin logical network address"; "Communication destination logical network address"; "Header 2"; "Data type"; "Excess data communication request/communication approval header"; "Allotted time useable for sending of excess data"; "Communication origin node number"; "Communication destination node number"; "Header 3"; "Data"; "Data footer"; "Check sum" and an "End code".

FIG. 5 is a diagram showing one example of the "Communication destination physical network address" field of the packet data format. For example, in the case of a broadcast communication, in a "communication destination physical network address" comprised of 6 bytes, all bytes are "1". Note that "x" in the same diagram indicates "don't care".

FIG. 6 is a diagram showing one example of the "Data type" field of the packet data format. As an example, a synchronization start data packet is "1101".

FIG. 7 is a diagram showing one example of the "Excess data communication request/communication approval header" field of the packed data format. As an example, an excess data communication approval is "01".

Next, explanation is made of operations of the communications control system for elevators according to this Embodiment 1, making reference to the drawings.

Figure 8:
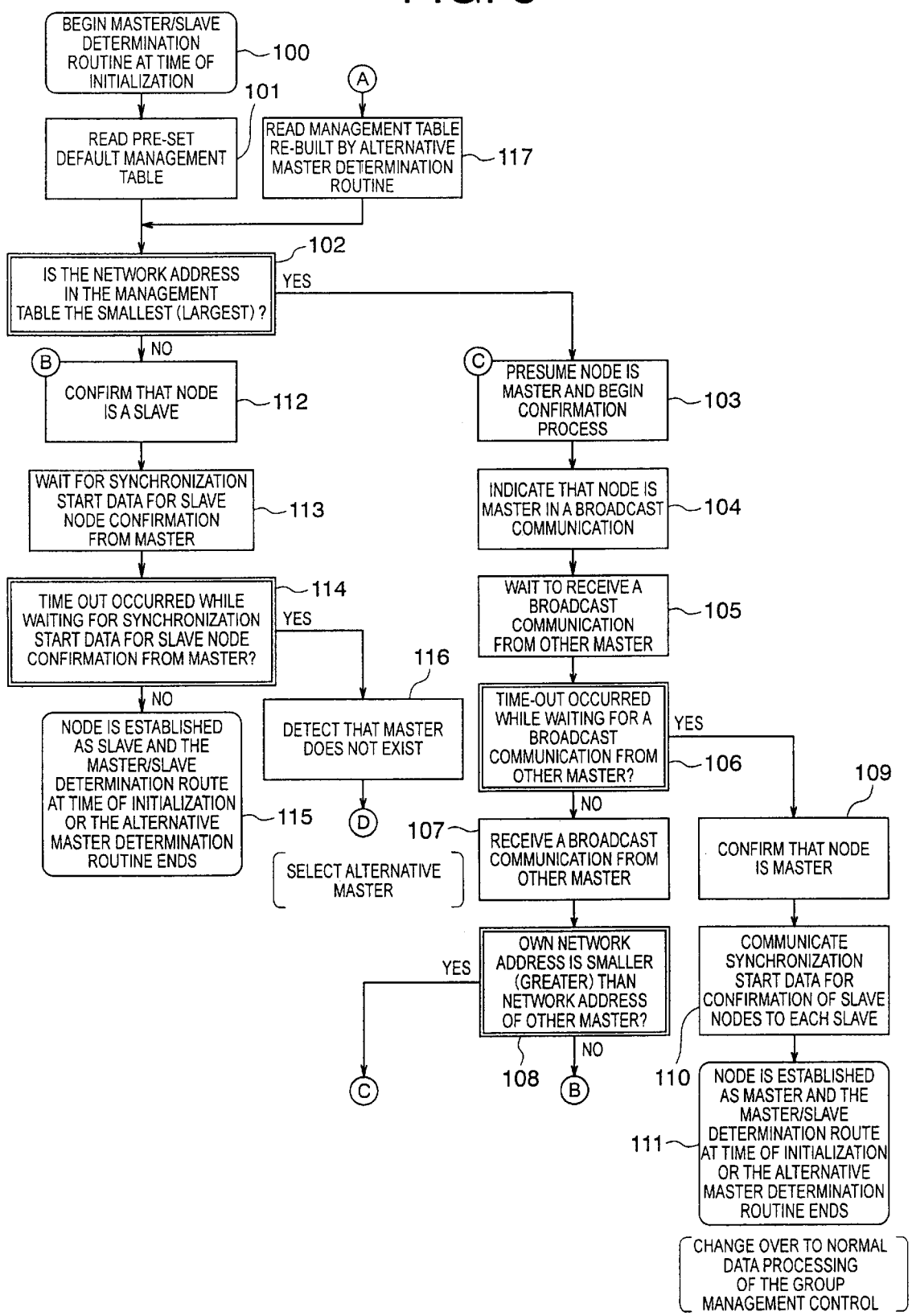
FIG. 8 is a flow chart depicting an operation of determining a master and a slave in the communications control system for elevators according to Embodiment 1 of the present invention.
Figure 9:
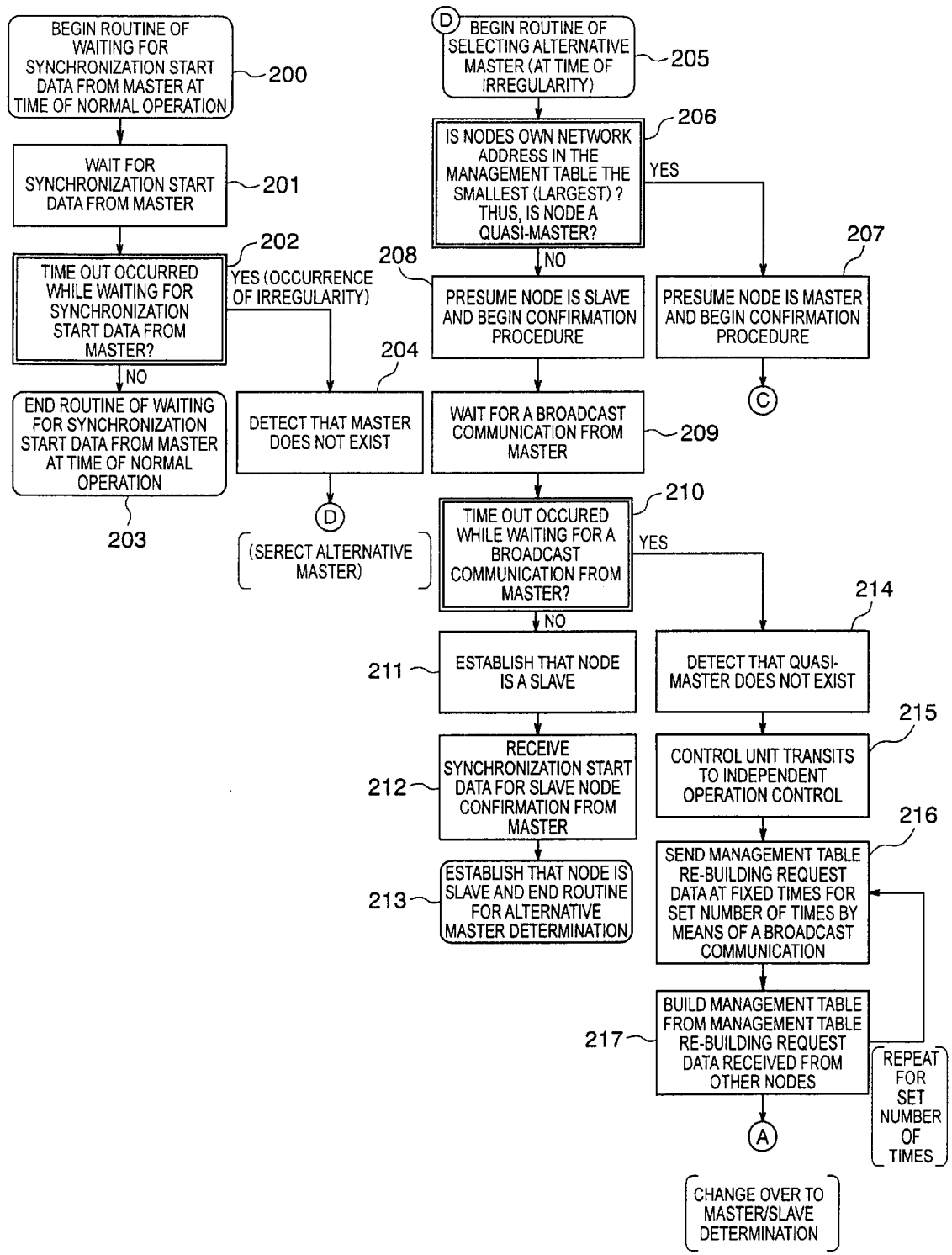
FIG. 9 is a flow chart depicting the operation of determining the master and the slave in the communications control system for elevators according to Embodiment 1 of the present invention.

First, explanation is made making reference to the flow charts of FIG. 8 and FIG. 9 of the network master for governing synchronization communications among the communications devices of each control unit joined by means of the transmission line 31, and a method of determining a slave for obeying the network master. A program represented by these flow charts is stored in the ROM 14 of the communications device 10.

Note that in the explanation made hereinafter, the communications device 10 of each control unit 20A to 201H is referred to as a "node", of which only one is permitted to exist at a given time; a node for performing management relating to network data sending and receiving is referred to as a "network master node" (abbreviated as "master"); and all other nodes that are not masters are referred to as "network slave nodes" (abbreviated as "slave").

In a master/slave determination routine explained below, the control unit that is the node to become the master may be the group management control unit 1, for example, or may be the elevator hall registration control unit 5. The master is determined by the greatness of the value of logical network address set in advance in the network address management table.

At step 100, each node (the communications control device 10 of each control unit) first begins the master/slave determination routine performed at a time of initialization.

Next, at step 101, pre-set default node numbers of all nodes of the given network and the network address management table shown in FIG. 3 which establishes correspondences among, for example, network address actually used in communications are read. For example, the network address management table is read from the ROM 14 to the RAM 15.

Next, in steps 102 and 103, each node determines the greatness of the value of the network address which has been allocated for itself, and when the allocated network address has the smallest value (or the greatest value) within the network, the node presumes that it is the master and begins a confirmation process. In other words, each node refers to the network address management table and when the logical network address corresponding to the node number inputted from an external source, for example, which the node recognizes as its own node number is the smallest (or greatest) from among the logical network addresses in the management table, the node begins the confirmation process as a temporary master.

Next, at step 104 the temporary master performs data communication by means of a broadcast communication (i.e., a broadcast communication) to the entire network indicating that it is the master. That is, the node acting as the temporary master buries data indicating the broadcast communication shown in FIG. 5 into the "Communication destination logical network address" field of the packet data; buries the logical network address corresponding to its own node number into the "Communication origin logical network address" field; buries data indicating that it is the master into the "Data type" field; and additionally, buries appropriate data into each field, and sends to the transmission line 31.

Next, at steps 105 to 107, at this point there is discrepancy among the network address management tables set in advance in each node. A node which was not originally supposed to be the temporary master is mistakenly judged to be a temporary master, and even if data is sent as the broadcast communication indicating that the node is the master (step 104), the correct temporary master receives a broadcast communication from another temporary master.

Next, at step 108 the correct temporary master compares its own logical network address and the logical network address of the mistaken temporary master. In the case when its own is smaller (or greater), the process returns to step 103 (C) and may use another broadcast communication indicating that it is the master to inform the mistaken temporary master that this mistaken temporary master is not the master. The mistaken temporary master receives a broadcast communication from the other temporary master (step 107), and therefore, when this mistaken temporary master compares the logical network address and recognizes that its own logical network address is greater (or smaller) it changes over to the slave confirmation processing of Step 112 (B).

Next, at steps 109 to 110, the confirmed master sends node confirmation synchronization start data to all the slaves and performs a confirmation process to determine how many slaves comprise the network. That is, the master performs with the slave a synchronization communication explained below.

Then, at step 111 the master performs a correction of the default-set network address management table by means of this confirmation process, and confirms the corrected management table and ends the master/slave determination routine. This corrected management table is sent at regular intervals to each slave among the normal sending and receiving of network data, and updating is realized. In other words, the master updates the "Alive/Dead Identifier", "Master/Slave" and such items in the network address table based on slave information obtained from the above confirmation process. Then, the master buries the logical network address corresponding to its own node number into the "Communication origin logical network address" field of the packet data; buries the data "1100" which indicates the management table distribution shown in FIG. 6 into the "Data type" field; buries the corrected management table into the "Data" field; and additionally, buries appropriate data into each field and sends to the transmission line 31.

On the other hand, at steps 112 to 115 the conformed slave receives the slave confirmation synchronization start data and ends the master/slave determination routine.

According to this procedure, a plurality of mistaken masters exist at the time of boating due to discrepancy in the default-set management table, are booted in sequence at varying times and send out broadcast communications indicating that they are masters (step 104) at varying times; nevertheless, these problems are solved without fail and a single master is selected in the given network without fail.

At steps 200 to 203, when the master and the slave are performing communications in a normal manner, each of the nodes that are slaves in the given network starts a routine for waiting to receive the synchronization start data from the master at a time of normal functioning, and if a time-out does not occur then the nodes end this routine for waiting to receive the synchronization start data from the master at the time of normal functioning.

Hereinafter is a description of processing at a time when the master suddenly goes down in a network that is functioning normally.

At step 204 each node that is a slave on the given network has gone through the routine of steps 200 to 203 for waiting to receive the synchronization start data from the master at a time of normal functioning, and a predetermined duration of waiting to receive synchronization start data from the master has passed without receiving the synchronization data. At that time, it is recognized that a master does not exist. When it is detected that the master does not exist, the processing immediately changes over to an alternative master selection routine of step 205.

At steps 205 to 207, based on the greatness of the value of the logical network address in the management table that is periodically updated by the master, in the case when the logical network address corresponding to the node number of itself is the second smallest (second greatest) after that of the master, the node presumes that it is a quasi-master and changes over to the confirmation processing of step 103 (C) to perform a series of master confirmation processing. This determination is made based on the greatness of the value of the logical network address in the management table that is periodically updated by the master. Therefore, this master confirmation process is carried out quickly without repeating the confirmation processing that includes the mistaken determination caused by the discrepancy of the network address management table.

On the other hand, at steps 208 to 213, when each slave is not a quasi-master based on the greatness of the network address in the management table periodically updated by the master, that is when a slave is once again determined to be a slave, the slave then waits to receive the broadcast communication from the master. If this broadcast communication is received, the slave is confirmed to be a slave. Then, at this point, the slave receives the slave node confirmation synchronization start data from the confirmed quasi-master, and ends the alternative master determination routine.

Further, description will now be provided of processing at a time when a given network is operating normally, the master goes down due to such a reason as physical disconnection of the network, and after that, the quasi-master having the second smallest (or greatest) logical network address after the downed master has also goes down suddenly.

The transition from the processing performed at a time of normal conditions is as explained below. At steps 209, 210, and 214, after going through steps 200 to 202, steps 204 to 206 and step 208 each node waits again as a slave candidate for the broadcast communication data from the quasi-master; however, the quasi-master is also down, so the time-out occurs and it is detected that the quasi-master does not exist.

Next, at step 215, due to the above circumstances each node therefor informs the nodes of the respective car control units 2–4, which are actually controlling operation of the elevator cars, that the group management control for a plurality of elevators has become disabled. The respective car control units 2–4 each independently perform elevator car operation without relying on group management.

Next, at steps 216–217 each node then rebuilds a new network address management table. This rebuilding is performed using the management table currently existing after being updated by the downed master, without relying on the pre-set default network address management table. Each slave sends a management table re-build request by means of a broadcast communication at regular intervals for n number of times. Further, each slave uses the management table re-build request data sent from the other slaves by means of a similar broadcast communication to confirm the currently surviving nodes. At this time each slave rebuilds the management table and a new master is re-defined from among the network addresses, so the process changes over to a master/slave re-determination process of step 117 (A). At the steps following step 117 a new master is re-selected from the re-built management table according to the procedure explained above.

Figure 10:
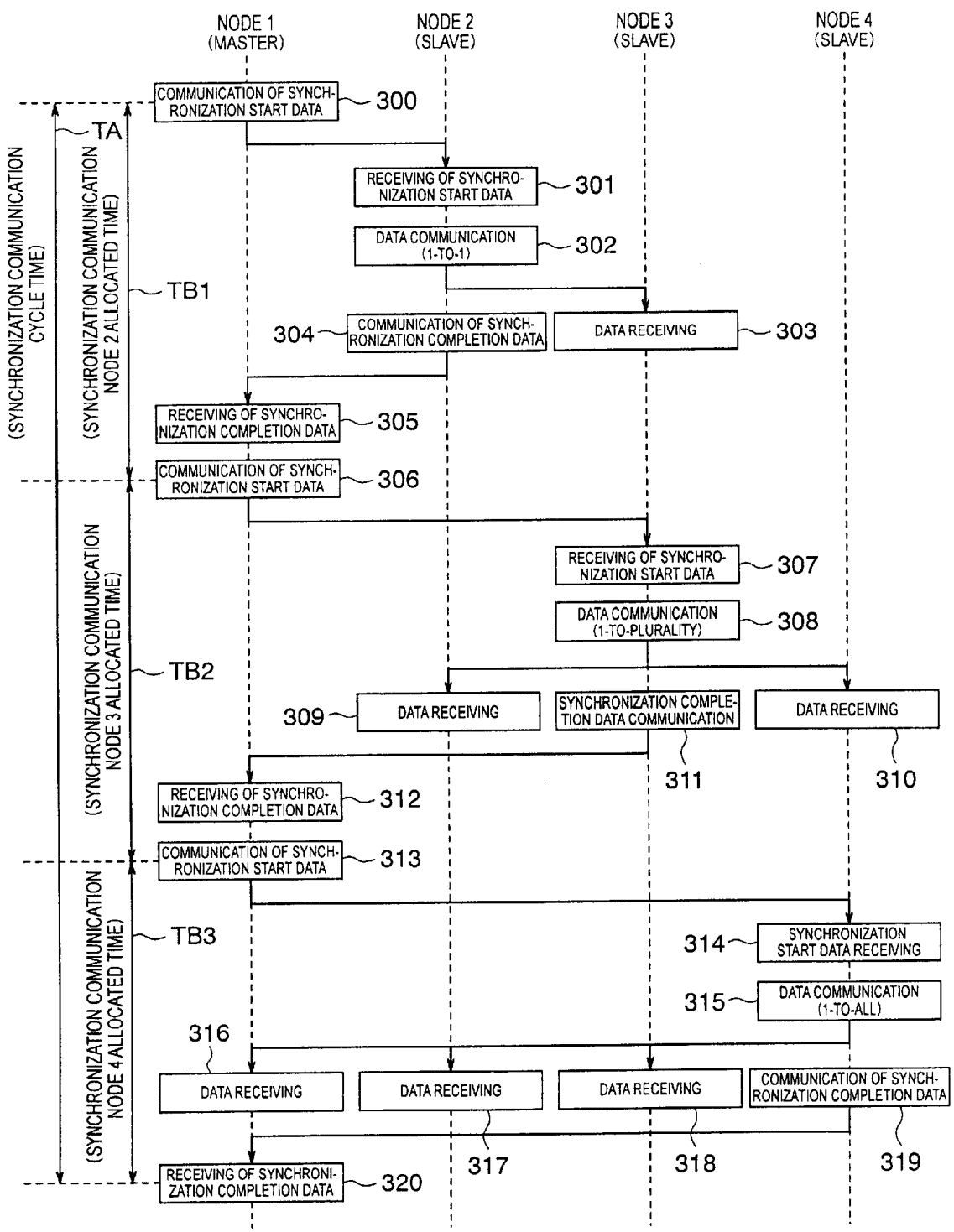
FIG. 10 is a flow chart depicting a synchronization sequence of the master and the slave in the communications control system for elevators according to Embodiment 1 of the present invention.

Next, explanation is made of the synchronization communication performed among the single master existing on the given network and the other nodes which are referred to as slaves. FIG. 10 is a diagram showing a synchronization communication sequence of the master and the slaves of the communications control system for elevators according to Embodiment 1.

FIG. 10 is explained for the sake of convenience with the four nodes 1–4 being connected to the network.

First, at step 300 the master (node 1) sends the synchronization start data to a slave (node 2). That is, the master buries the data indicating one-on-one communication shown in FIG. 5 into the "Communication destination physical network address" field of the packet data; buries the logical network address corresponding to its own node number into the "Communication origin logical network address" field; buries the logical network address corresponding to the node number of the given slave node into the "Communication destination logical network address" field; buries the data "1101" indicating the synchronization start data shown in FIG. 6 into the "Data type" field; and additionally, buries appropriate data into each field, and sends to the transmission line 31.

Next, at steps 301–304, when the slave receives the synchronization start data from the master, the slave is entrusted by the master with the right to send data, and performs communications of data which are necessary to the slave. In FIG. 10, the sending of data to the slave (node 3) falls under this. After that, the slave continues to communicate data a number of times (not shown in the diagram), then communicates synchronization completion data to the master and returns the data communication right to the master.

For example, in a case when the control unit corresponding to the slave (node 2) is the elevator hall registration control unit 5, the control unit corresponding to the slave (node 3) is the group management control unit 1, and the control unit corresponding to the master is a control unit other than the control unit mentioned above, then the slave (node 2) buries the data indicating one-on-one communication shown in FIG. 5 into the "Communication destination physical network address" field of the packet data; buries the logical network address corresponding to its own node number into the "Communication origin logical network address" field; buries the logical network address corresponding to the node number of the slave (node 3) into the "Communication destination logical network address" field; buries the elevator hall call registration information from the elevator hall button registration device 41 installed on each floor via the transmission line 32 into the "Data" field; and additionally, buries appropriate data into each field, and sends to the transmission line 31.

Further, the slave (node 2) buries the data indicating one-on-one communication shown in FIG. 5 into the "Communication destination physical network address" field of the packet data; buries the logical network address corresponding to its own node number into the "Communication origin logical network address" field; buries the logical network address corresponding to the node number of the master into the "Communication destination logical network address" field; buries the data "1110" indicating the synchronization completion data shown in FIG. 6 into the "Data type" field; and additionally, buries appropriate data into each field, and sends to the transmission line 31.

Next, at step 306 the master then entrusts to another slave (node 3) the right to communicate data, so synchronization start data is sent to that slave.

Next, at steps 307 to 311 the slave (node 3) performs similar necessary data communication with the node 2. As an example of data communication performed at this time, FIG. 10 shows sending of broadcast communication data to a plurality of nodes, that is, nodes 2 and 4. After completion of communicating the necessary data, the slave communicates synchronization completion data to the master and returns to the master the right to communicate data.

Next, at step 313 the master transfers to yet another slave (node 4) by means of a similar procedure the right to communicate data.

Next, at steps 314 to 319 the slave (node 4) sends out a broadcast communication to all nodes, that is, node 1 to node 3 other than itself. After performing the necessary data communication, the slave communicates the synchronization completion data to the master.

Then at step 320, the master receives the synchronization completion data from the slave (node 4) and thus completes one cycle of the data communication of that network. Normal synchronization communications maintain and continue data communication by infinitely repeating the data communication of this one cycle.

After communicating the synchronization start data (step 300) to the first slave (node 2), the master measures time by starting two timer countdowns.

One is a timer for measuring the time from the communicating of the synchronization start data to the first slave (node 2) (step 300) until the receiving of the synchronization completion data from the last slave (node 4) (step 320). The time measured by this timer is referred to as a synchronization communication cycle time TA, and the length of this time is checked, for example, by comparison against a specified management time set in advance as a length of time that should be managed. Whether or not the network is completing the sending and receiving of data within the predetermined duration of time, that is, whether or not real time operations are being maintained, is detected.

The other timer is for measuring the time from the communicating of the synchronization start data to the first slave node (node 2) (step 300) until the communicating of the synchronization start data to the subsequent slave (node 3) (step 306). The time measured by this timer is referred to as a synchronization communication node 2 allocated time TB1. This is performed in connection with every slave, and the synchronization communication node allocated times of every slave are checked, for example, by comparison against a specified management time set in advance as a length of time that should be managed. Note that for the last slave, that is slave 4 in the present example, the time is measured from the communicating of the synchronization start data to the last slave node (node 4) (step 313) until the receiving i of the synchronization completion data from the last slave (node 4) (step 320), and this time is referred to as a synchronization communication node 4 allocated time TB3.

By having the master check these times every time for each node, a judgment is made as to whether each slave is performing synchronization communications normally and whether a node has gone down or not. These two times TA and TB are checked every time by the master in real time while the master is performing communications.

Although it is not explicitly shown in FIG. 10, when the master (node 1) has data other than the synchronization start data which it wants to send to a another node, the master performs the communicating of this data to the slaves (nodes 2–4) during a section of time being either before the communicating of the synchronization start data to the slave (node 2) (step 300) or after the receiving of the synchronization completion data from the slave (node 4) (step 320).

Further, although it has not been shown in FIG. 10 since the diagrams would become excessively complicated, it is possible to add a procedure for the receiving node to return response (ack) data to the sending source node indicating that the data has been received in the communicating of all data among the nodes including the master and slaves. However, this procedure for responding does not need to be added. In the case when the synchronization communication cycle time TA is short and sending and receiving of data in the network is repeated frequently, it is more efficient not to have the response (ack) data. On the other hand, in a case such as when the synchronization communication cycle time TA is relatively long and the data communication and receiving in the network is repeated relatively slowly, it is more efficient to have the response (ack) data.

Embodiment 2

Figure 11:
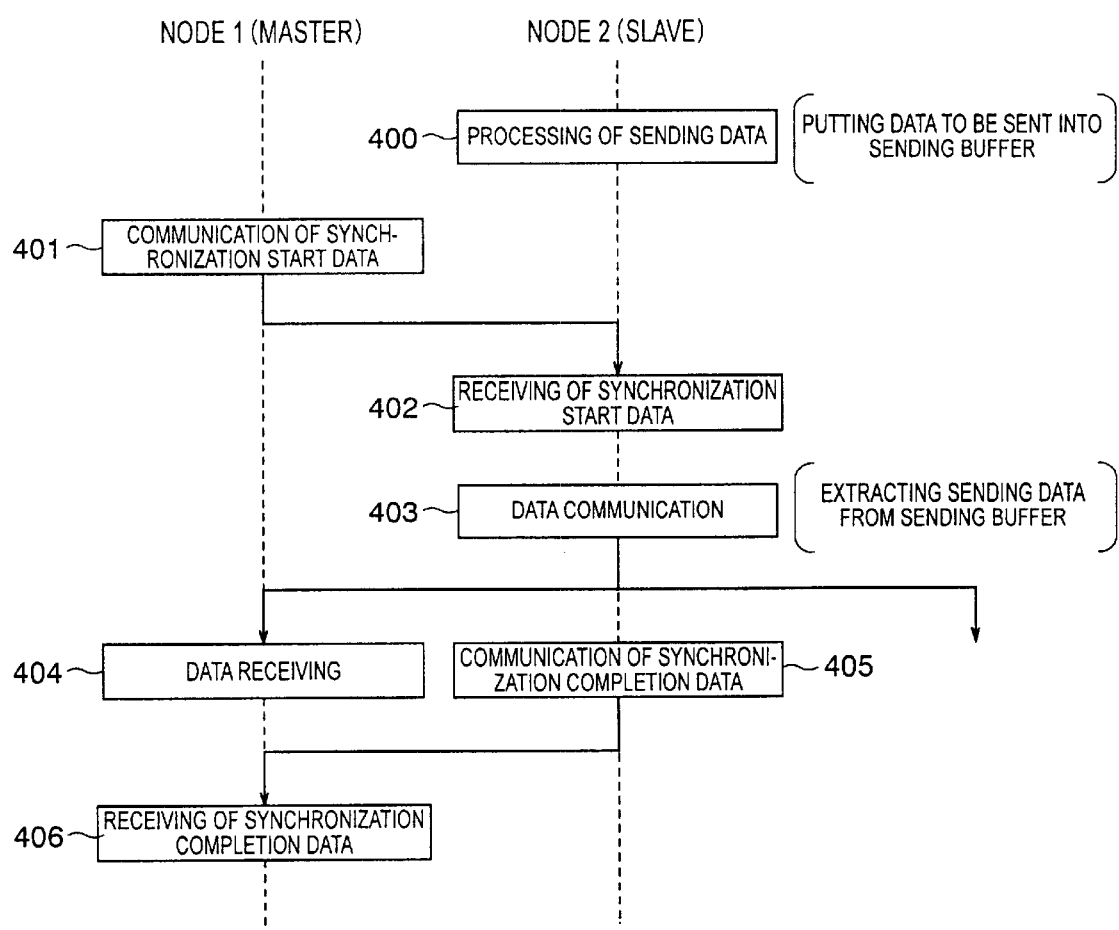
FIG. 11 is a flow chart depicting a synchronization sequence of the master and the slave in a communications control system for elevators according to Embodiment 2 of the present invention.

Explanation is made of a communications control system for elevators according to Embodiment 2 of the present invention, making reference to the drawings. FIG. 11 is a diagram showing operations of the communications control system for elevators according to Embodiment 2 of the present invention. Note that, in the communications control system for elevators according to Embodiment 2 of the present invention, the construction and main operations such as operations for determining the master and operations relating to synchronization communications are the same as those of Embodiment 1 described above.

FIG. 11 depicts where the times are in an actual time series of a communications sequence at which each slave performs processing of its sending data. In this figure the sending data processing of the slave (node 2) is shown for purposes of convenience; however, the processing is the same for any master or slave.

At step 400 the slave (node 2) performs, in advance, the processing of its data that is to be sent. That is, the slave (node 2) performs, in advance, a procedure of extracting data from a receiving buffer 12b inside the transmission LSI 12, performing appropriate processing on this data, and after that, putting into the sending buffer 12a data that should be sent.

Next, at steps 402–405 the slave receives the synchronization start data from the master, and after that, performs the communicating of the data, that is the procedure of communicating the data from the sending buffer 12a directly to the network.

The slave receives the synchronization start data from the master, and after that, does not perform any sending preparation procedures at all such as loading data into the sending buffer 12a. Sending preparation procedures such as loading the data into the sending buffer 12a may, depending on the actual software for performing the slave's communications procedures, adopt some other timing other than the timing based on the receiving of the synchronization start data form the master. For example, the sending preparation procedure may be performed in the middle of the data processing performed when the data is received from network slaves instead of when the synchronization start data is received from the master, or as a part of the background processing of the software itself.

Embodiment 3

Figure 12:
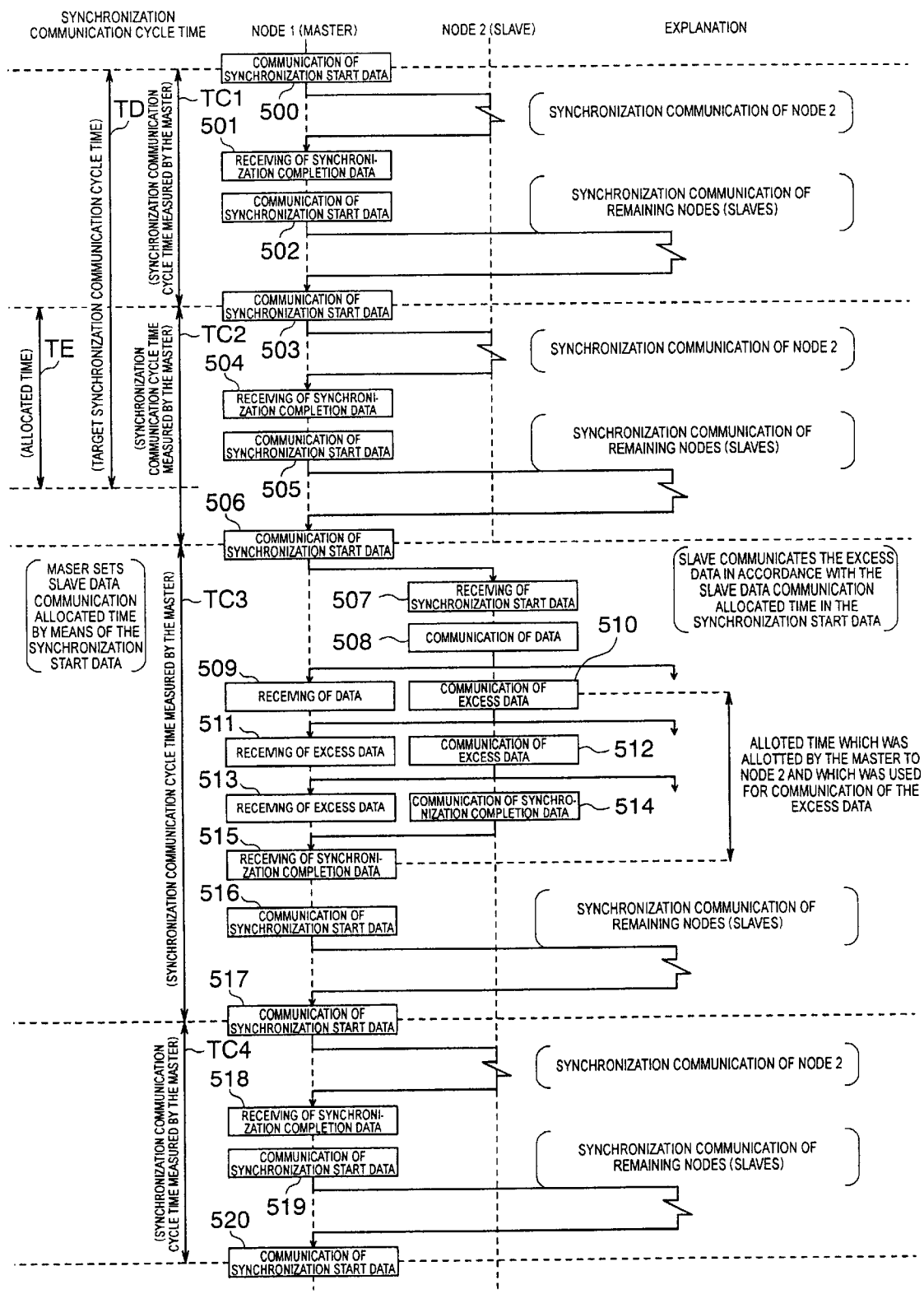
FIG. 12 is a flow chart depicting a synchronization sequence of the master and the slave in a communications control system for elevators according to Embodiment 3 of the present invention.

Explanation will now be made of a communications control system for elevators according to Embodiment 3 of the present invention, making reference to the drawings. FIG. 12 is a diagram showing a synchronization communications sequence of the communications control system for elevators according to Embodiment 3 of the present invention. Note that, in the communications control system for elevators according to Embodiment 3 of the present invention the construction and main operations such as operations for determining the master are the same as those of Embodiment 1 described above.

FIG. 12 is a diagram showing, as a time series chart, a basic synchronization communication sequence of a method for effectively using excess time that is left over from the time for one cycle of the synchronization communication by means of the master monitoring the cycle time of the synchronization communication.

The basic synchronization communication sequence has already been explained in connection with Embodiment 1 using FIG. 10. Therefore, explanation will be made here only of the master monitoring the synchronization communication cycle time and the basic method for controlling the time that the slave communicates its excess data by means of a slave data communicating allocated time command given in the synchronization start data sent to the slaves.

FIG. 12 shows, for purposes of convenience, the synchronization communications processing of the slave (node 2); however, the synchronization communications processing is the same for any slave.

At steps 500 to 503 the master measures by means of a timer a synchronization communication cycle time TC1 running from the synchronization start data communicating processing of the slave of the previous synchronization communication until the synchronization start data communicating processing of the slave of the subsequent synchronization communication. Note that, the receiving processing of the synchronization completion data from nodes other than the slave (node 2), for example, have been omitted from FIG. 12 because representation thereof would become exceedingly complicated.

When the synchronization communication cycle time TC1 having been measured is smaller than the target synchronization communication cycle time TD, the master updates the synchronization communications node 2 allocated time TB1 which is allocated to the slave (node 2) and which was explained in connection with Embodiment 1 described above, based on an allocated time TE calculated by subtracting the measured synchronization communication cycle time TC1 from the target synchronization communication cycle time TD.

Then at step 506 when the master communicates the synchronization start data to the slave of the subsequent synchronization communication the master controls the excess data communication time of that slave by setting the slave data communication allocated time command. In other words, the master buries the data indicating one-on-one communication shown in FIG. 5 into the "Communication destination physical network address" field of the packet data; buries the logical network address corresponding to its own node number into the "Communication origin logical network address" field; buries the logical network address corresponding to the node number of the given slave node into the "Communication destination logical network address" field; buries the data "1101", indicating the synchronization start data shown in FIG. 6 into the "Data type" field; buries the allocated time TE into the "Allotted time useable for sending of excess data" field; and additionally, buries appropriate data into each field, and sends to the transmission line 31.

On the other hand, at steps 507 to 513, after normal data communication the slave communicates its excess data in accordance with the slave data communication allocated time command from the master. Here, the entirety of the allocated time TE is allocated for the excess data communication time of a specific slave (node 2); however, it is also possible for the master to perform controls such that the allocated time TE is allocated for the excess data communication time of the remaining slaves.

Figure 13:
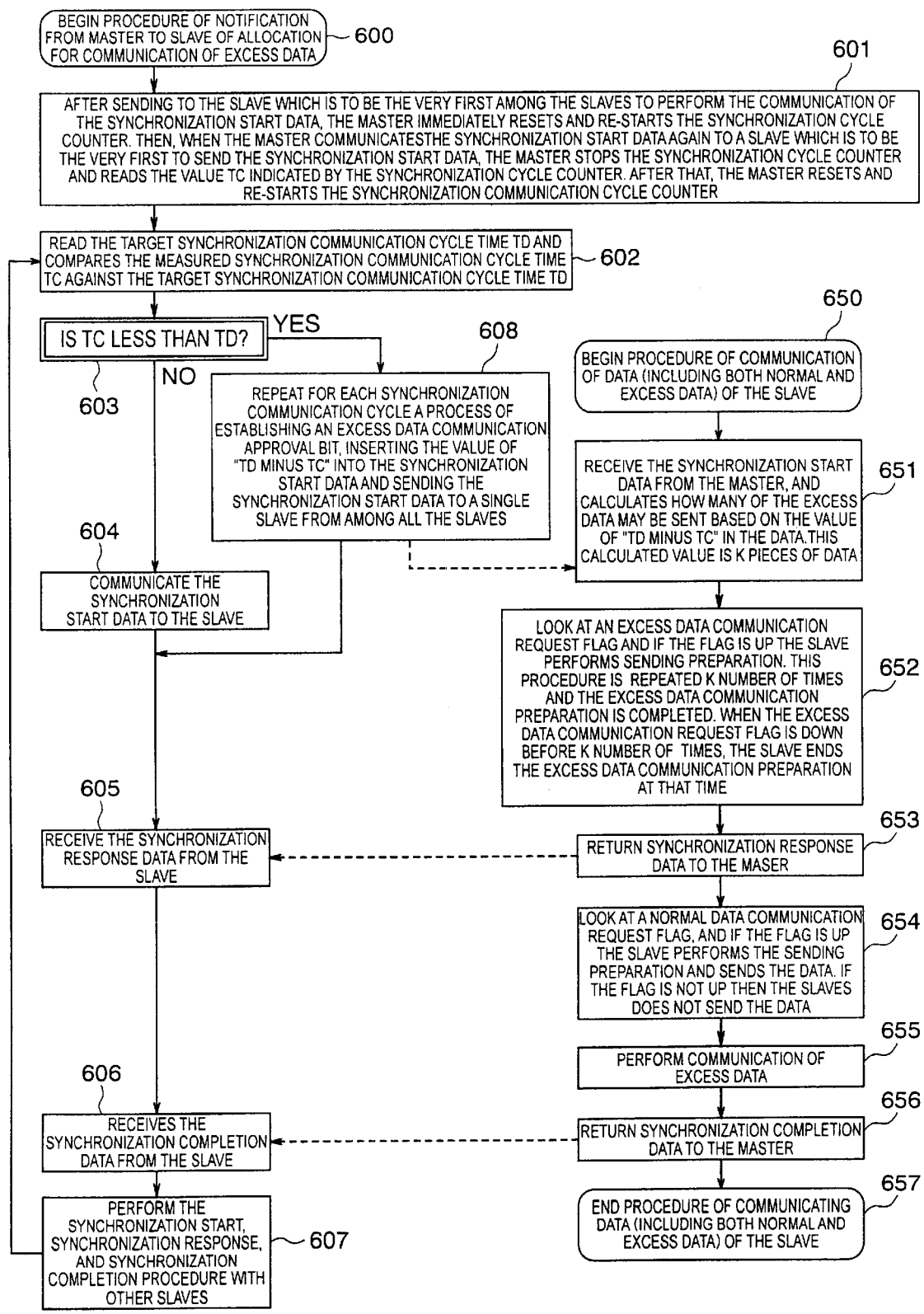
FIG. 13 is a flowchart depicting an operation of a communication of excess data of the master and the slave according to Embodiment 3 of the present invention.

Explanation will now be made, making reference to FIG. 13, of detailed operations of the master monitoring the cycle time of the synchronization communications and controlling the excess data communication time of the slaves by means of the slave data communication allocated time command in the communication of synchronization start data to the slaves.

At step 601, after sending to the slave which is to be the very first among the slaves to perform the communication of the synchronization start data, the master immediately resets and re-starts the synchronization cycle counter. Then, when the master communicates the synchronization start data again to a slave which is to be the very first to send the synchronization start data, the master stops the synchronization cycle counter and reads the value TC indicated by the synchronization cycle counter. After that, the master resets and re-starts the synchronization communication cycle counter.

Next, at step 602, the master reads the target synchronization communication cycle time TD and compares the measured synchronization communication cycle time TC against the target synchronization communication cycle time TD.

Next, at step 603, in the case when a relationship obtains such that TC is less than TD, the process transits to step 608. When such a relationship does not obtain, the process transits to the next step 604.

Next, at step 604 the master communicates the synchronization start data to the slave.

Next, at step 605 the master receives the synchronization response data from the slave.

Next, at step 606 the master receives the synchronization completion data from the slave.

Next, at step 607 the master performs the synchronization start, synchronization response, and synchronization completion procedure with other slaves.

Further, at step 608, for each synchronization communication cycle the master repeats a process of establishing an excess data communication approval bit, inserting the value of "TD minus TC" into the synchronization start data and sending the synchronization start data to a single slave from among all the slaves.

On the other hand, at step 651 the slave receives the synchronization start data from the master, and calculates how many of the excess data may be sent based on the value of "TD minus TC" in the data. This calculated value is k pieces of data.

Next, at step 652 the slave looks at an excess data communication request flag and if the flag is up the slave performs sending preparation. This procedure is repeated k number of times and the excess data communication preparation is completed. When the excess data communication request flag is down before k number of times, the slave ends the excess data communication preparation at that time.

Next, at step 653 the synchronization response data is returned to the master.

Next, at step 654 the slave looks at a normal data communication request flag, and if the flag is up the slave performs the sending preparation and sends the data. If the flag is not up then the slave does not send the data.

Next, at step 655 the excess data is sent.

Next, at step 656 the synchronization completion data is sent to the master.

Then, at step 657, the slave ends the data communication procedure.

Embodiment 4

Figure 14:
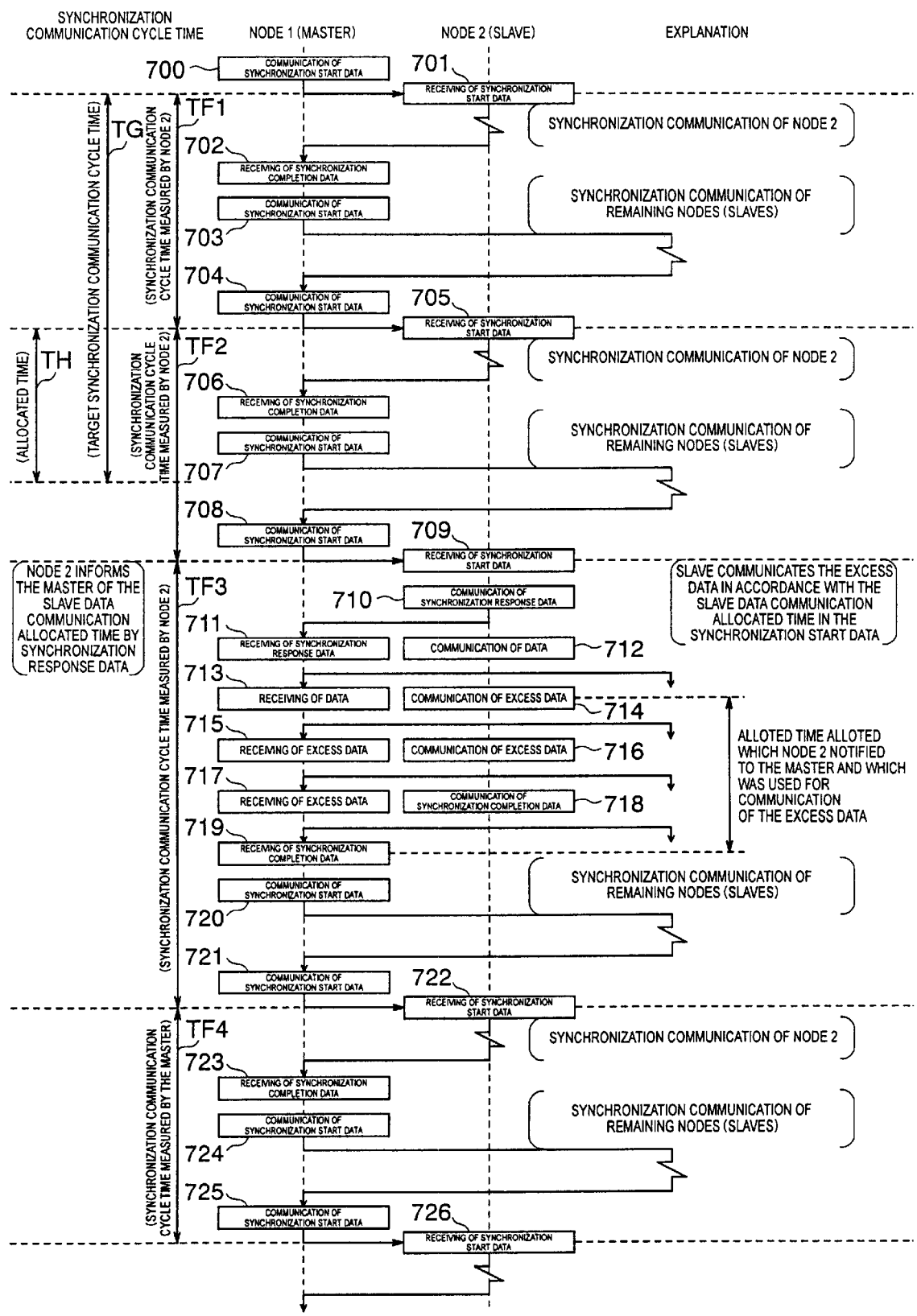
FIG. 14 is a flowchart depicting a synchronization communication sequence of the master and the slave according to Embodiment 4 of the present invention.

Explanation is made of a communications control system for elevators according to Embodiment 4 of the present invention, making reference to the drawings. FIG. 14 is a diagram showing a synchronization communication sequence of the communications control system for elevators according to Embodiment 4 of the present invention. Note that, in the communications control system for elevators according to Embodiment 4 of the present invention the construction and main operations such as operations for determining the master are the same as those of Embodiment 1 described above.

FIG. 14 is a diagram showing, as a time series chart, a basic synchronization communication sequence of a method for effectively using excess time that is left over from the time for one cycle of the synchronization communication by means of the slave monitoring the cycle time of the synchronization communication.

The basic synchronization communication sequence has already been explained in connection with Embodiment 1 using FIG. 10. Therefore, explanation will be made here only of the slave's monitoring of the synchronization communication cycle time and the basic method of the slave controlling its own excess data communication time by means of sending a slave data communication allocated time request in the synchronization response data sent to the master.

For purposes of convenience, the synchronization communications processing of the slave (node 2) is shown; however, the synchronization communications processing is the same for any slave.

At steps 701 to 705, the slave measures, by means of a timer, a synchronization communication cycle time TF1 running from the receiving processing of the synchronization start data of the previous synchronization communication until the receiving processing of the synchronization start data of the subsequent synchronization communication. Note that, the sending processing of the synchronization completion data by the slave, the receiving processing of the synchronization completion data by the master and the like have been omitted from FIG. 14 because representation thereof would become exceedingly complicated.

At step 710 the slave makes a request to the master for excess data communication time by burying into the synchronization response data of the subsequent communication an allocated time TH as a slave data communication allocated time request, this allocated time TH being calculated by subtracting a measured synchronization communication cycle time TF1 from a target synchronization communication cycle time TG. In other words, the slave buries the data indicating one-on-one communication shown in FIG. 5 into the "communication destination physical network address" field of the packet data; buries the logical network address corresponding to its own node number into the "Communication origin logical network address" field; buries the logical network address corresponding to the node number of the master into the "Communication destination logical network address" field; buries the data "1111" indicating the synchronization response data shown in FIG. 6 into the "Data type" field; buries the allocated time TH into the "Allotted time useable for sending of excess data" field; and additionally, buries appropriate data into each field, and sends to the transmission line 31.

At step 711 the master confirms the slave data communication allocated time request in the receiving processing of synchronization response data, and updates the synchronization communications node 2 allocated time TB1 that is for the slave (node 2).

At steps 712 to 716, after communicating the normal data the slave communicates its excess data using the time it requested from the master by means of the slave data communication allocated time request, that is, the allocated time TH.

This method may seem, at first glance, to be an unequal distribution of excess time to the slaves. However, according to the above method, in one communication cycle the slave (node 2) uses plenty of the excess time of the synchronization communication cycle time by itself; therefore, in the next cycle the measured synchronization communication cycle time TF will be nearly equal to the target synchronization communication cycle time. As a result, in the next cycle the slave (node 2) cannot secure excess time to perform communication of data. Instead, other nodes node 3, node 4 and node 1 will be able to secure excess time one after the other.

Node 3 uses the excess time, node 3 is then unable to secure this time in the next cycle, and then node 4 is able to secure excess time and uses the same. This is the pattern of the cycle of securing excess time. Therefore, it is possible to maintain and continue communication of data in an equal fashion without excess time being needlessly secured by nodes for which excess time is unnecessary, and without the measured synchronization communication cycle time TF exceeding the target synchronization communication cycle time TG.

Figure 15:
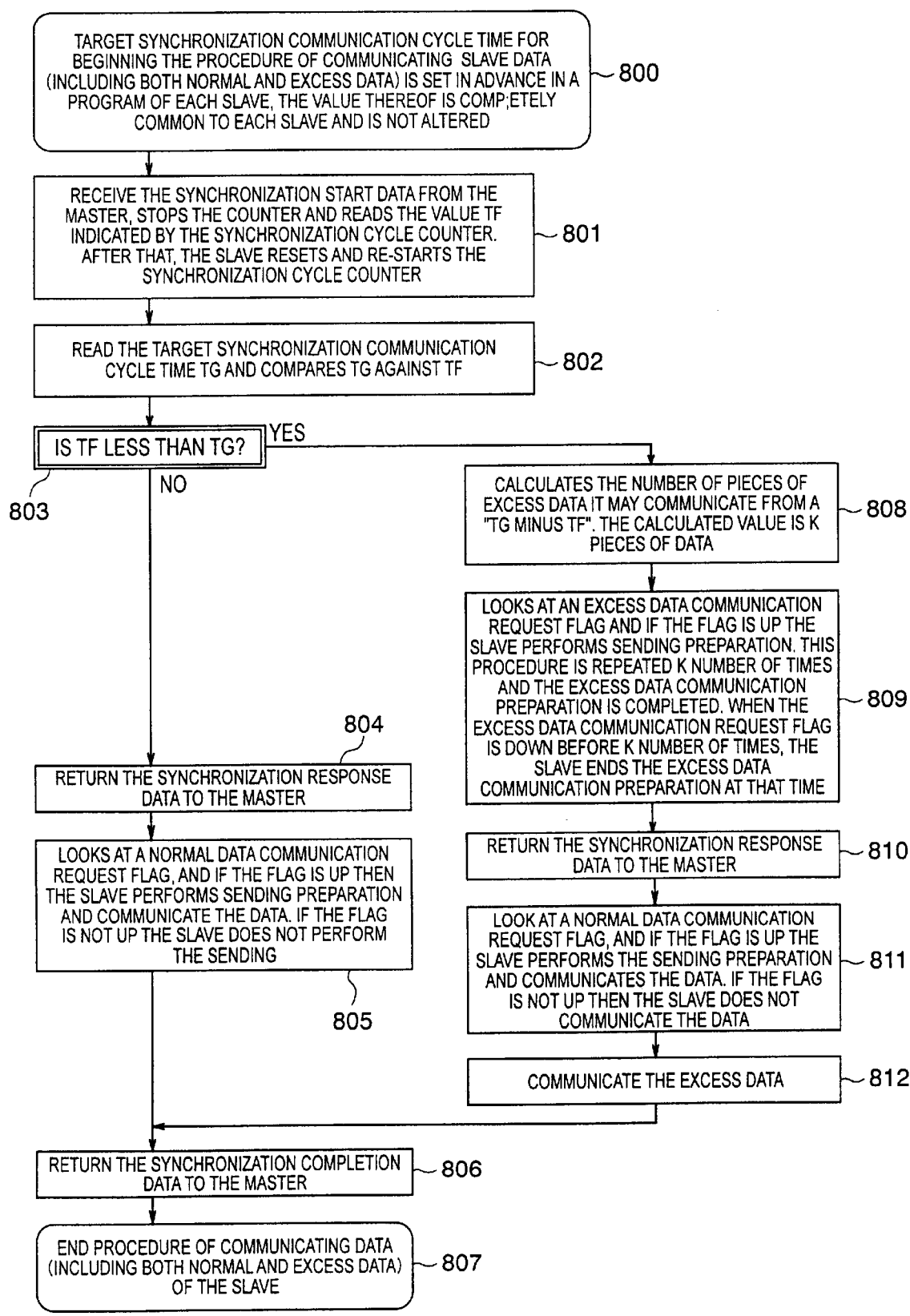
FIG. 15 is a flowchart depicting an operation of a communication of excess data of the slave according to Embodiment 4 of the present invention.
Figure 16:
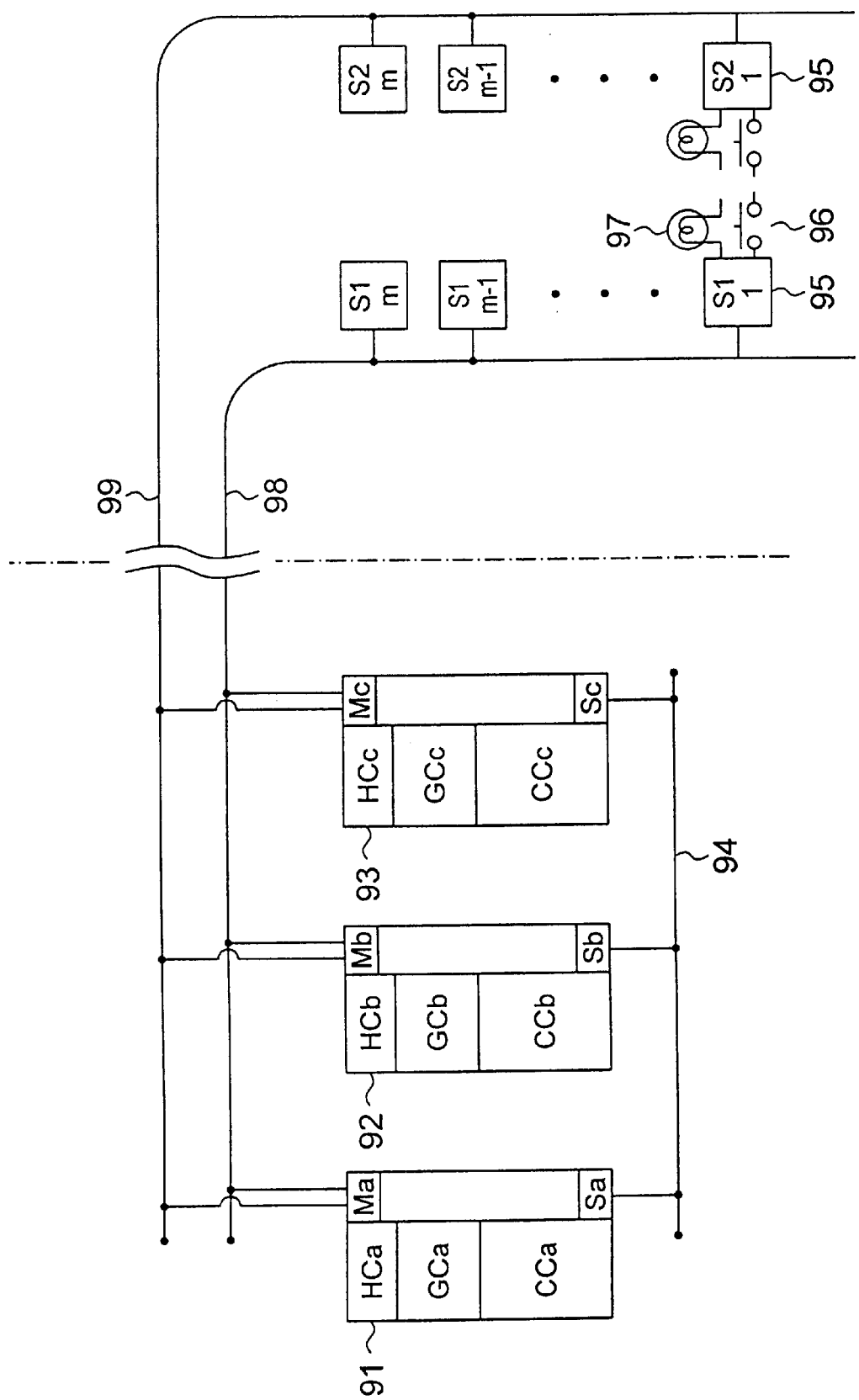
FIG. 16 is a diagram depicting a construction of a conventional communications control system for elevators.

Explanation will now be made, making reference to FIG. 15, of detailed operations of the monitoring the cycle time of the synchronization communication by the slave, and the controlling of the slave's excess data communication time by means of the slave data communication allocated time request which is inside the synchronization response data which is sent to the master.

At step 801 the slave receives the synchronization start data from the master, stops the counter and reads the value TF indicated by the synchronization cycle counter. After that, the slave resets and re-starts the synchronization cycle counter.

Next, at step 802 the slave reads the target synchronization communication cycle time TG and compares TG against TF.

Next, at step 803, in the case when a relationship obtains such that TF is less than TG, the process transits to step 808. When such a relationship does not obtain, the process transits to the next step 804.

Next, at step 804 the slave returns the synchronization response data to the master.

Next, at step 805 the slave looks at a normal data communication request flag, and if the flag is up then the slave performs sending preparation and communicates the data. If the flag is not up the slave does not perform the sending.

Next, at step 806 the slave returns the synchronization completion data to the master.

Then, at step 807 the slave ends the data communication procedure.

Further, the slave calculates the number of pieces of excess data it may communicate from a value "TG minus TF". The calculated value is k pieces of data.

Next, at step 809 the slave looks at an excess data communication request flag and if the flag is up the slave performs sending preparation. This procedure is repeated k number of times and the excess data communication preparation is completed. When the excess data communication request flag is down before k number of times, the slave ends the excess data communication preparation at that time.

Next, at step 810 the synchronization response data is returned to the master.

Next, at step 811 the slave looks at a normal data communication request flag, and if the flag is up the slave performs the sending preparation and communicates the data. If the flag is not up then the slave does not communicate the data.

Next, at step 812 the slave communicates the excess data. After that, the procedure transits to step 806.

Industrial Applicability

In a communications control system for elevators according to the present invention having a plurality of control units including at least respective car control units and elevator hall registration control units, each of the control units having a node, the plurality of nodes being mutually connected via a network, and each of the node having a management table establishing correspondence between a node number and a network address, as explained above, the communications control system comprises: a node acting as a master when, in a case where a first network address corresponding the node number of this node is, upon referring to the management table, a specific address in the management table, this node sends to all other nodes a broadcast communication to notify that this node is a temporary master having the first network address added thereto and receives from another temporary master a broadcast communication for notifying that this other node is the temporary master having a second network address corresponding to the node number of the other temporary master added thereto, if the first network address and the second network address conform to specific conditions; and a node acting as a slave when, in a case where the network address corresponding to the node number is not a specific address in the management table or the first network address corresponding to its node number is a specific address in the management table, the node sends to all other nodes a broadcast communication to notify that the node is the temporary master having the first network address added thereto and receives from another temporary master a broadcast communication for notifying that this other node is the temporary master having a second network address corresponding to the node number of this other temporary master added thereto, if the first network address and the second network address do not conform to the specific conditions; therefore, a result is produced such that useless collisions of data and prolongation of time for selecting a master due to such collisions may be eliminated.

In the communications control system for elevators according to the present invention, as explained above, the node acting as the slave acts as a quasi-master when, in a case where it does not receive synchronization start data from the node acting as the master within a predetermined amount of time and, upon referring to the management table, a third network address corresponding to its node number is a second specific address in the management table, the node sends to all other nodes a broadcast communication to notify that this node is a temporary master having the third network address added thereto and receives from another temporary master a broadcast communication for notifying that this other node is the temporary master having a fourth network address corresponding to the node number of the other temporary master added thereto, if this third and fourth network addresses conform to specific conditions; and the node acting as a slave acts as a slave once again in a case when the node references the management table and the third network address corresponding to its node number is not the second specific address in the management table and a broadcast communication is received from a node acting as the quasi-master stating this node acting as the quasi-master is the temporary master within the predetermined amount of time; therefore, an effect is produced such that transitioning of the network master may be completed speedily and without data collisions.

In the communications control system for elevators according to the present invention, as explained above, in the case when the node acting as the slave detects that the master and the quasi-master do not exist, this node acting as the slave sends to the other nodes by means of a broadcast communication a management table rebuild request data having the management table data currently held by the node added thereto, and changes over to an operation for determining the master upon rebuilding the management table based on the management table rebuild request data received from another node; therefore an effect is produced such that a speedy transition to an alternative master and a transition to operation control per elevator car may be completed without data collisions and without wait time.

In the communications control system for elevators according to the present invention, as explained above, the master sends a first synchronization start data to a first slave among a plurality of slaves; upon receiving synchronization completion data from a previous slave sends subsequent synchronization start data to a subsequent slave in sequence; upon receiving the synchronization completion data from a last slave from among the plurality of slaves completes one cycle of synchronization communication, and also, measures the one cycle of the synchronization communication as a synchronization communication cycle time, and measures a duration between the sending of the synchronization start data to each slave as a synchronization communication node allocated time, thus managing the communication; and the each slave upon receiving the synchronization start data from the master sends data to another node; and upon completing the sending of the data sends synchronization completion data to the master; therefore, an effect is produced such that the real time data communication at all the nodes on the network may be maintained while definitively avoiding data communication collisions, and the operation of the network may be performed with high efficiency.

In the communications control system for elevators according to the present invention, as explained above, each slave puts data that it needs to communicate into a sending buffer in advance before receiving the synchronization start data from the master; therefore, an effect is produced such that the availability of the network may be significantly improved without making the network idle.

In the communications control system for elevators according to the present invention, as explained above, the master measures a time duration of one cycle of the synchronization communication for a particular slave, and when this measured synchronization communication cycle time is less than a target synchronization communication cycle time the master adds an allocated time to the synchronization start data in a later synchronization communication with that particular slave and communicates the same, the allocated time being a differential of the measured synchronization communication cycle time and the target synchronization communication cycle time; and the particular slave upon receiving the synchronization start data from the master communicates excess data to another node separately from the normal data communication based on the allocated time; therefore, an effect is produced such that excess time may be efficiently used due to initiative by the master.

In the communications control system for elevators according to the present invention, as explained above, the slave measures a time duration of one cycle of its own synchronization communication, and when this measured synchronization communication cycle time is less than a target synchronization communication cycle time the slave adds an allocated time to a synchronization response data in a later synchronization communication with the master and communicates the same, the allocated time being a differential of the measured synchronization communication cycle time and the target synchronization communication cycle time; and the slave communicates excess data to another node separately from the normal data communication based on the allocated time; and the master upon receiving the synchronization response data from the slave controls the synchronization communication based on the allocated time; therefore, an effect is produced such that excess time may be efficiently used due to initiative by the slave.

In the communications control system for elevators according to the present invention having a plurality of control units including at least respective car control units and elevator hall registration control units, each of the control units having a node, the plurality of nodes being mutually connected via a network as a single master and a plurality of slaves, and each of the node having a management table establishing correspondence between a node number and a network address, the master communicates a first synchronization start data to a first slave among a plurality of slaves; upon receiving synchronization completion data from a previous slave sends subsequent synchronization start data to a subsequent slave in sequence; upon receiving the synchronization completion data from a last slave from among the plurality of slaves completes one cycle of synchronization communication, and also, measures the one cycle of the synchronization communication as a synchronization communication cycle time, and measures a duration between the sending of the synchronization start data to each slave as a synchronization communication node allocated time, thus managing the communication; and in which each slave upon receiving the synchronization start data from the master sends data to another node; and upon completing the sending of the data communicates synchronization completion data to the master; therefore, an effect is produced such that the real time data communication at all the nodes on the network may be maintained while definitively avoiding data communication collisions to thereby perform the operation of the network with high efficiency.

In the communications control system for elevators according to the present invention, as explained above, each slave puts data that it needs to communicate into a sending buffer in advance before receiving the synchronization start data from the master; therefore, an effect is produced such that the availability of the network may be significantly improved without making the network idle.

In the communications control system for elevators according to the present invention, as explained above, the master measures a time duration of one cycle of the synchronization communication for a particular slave, and when this measured synchronization communication cycle time is less than a target synchronization communication cycle time the master adds an allocated time to the synchronization start data in a later synchronization communication with that particular slave and communicates the same, the allocated time being a differential of the measured synchronization communication cycle time and the target synchronization communication cycle time; and the particular slave upon receiving the synchronization start data from the master communicates excess data to another node separately from the normal data communication based on the allocated time; therefore, an effect is produced such that excess time may be efficiently used due to initiative by the master.

In the communications control system for elevators according to the present invention, as explained above, the slave measures a time duration of one cycle of its own synchronization communication, and when this measured synchronization communication cycle time is less than a target synchronization communication cycle time the slave adds an allocated time to a synchronization response data in a later synchronization communication with the master and communicates the same, the allocated time being a differential of the measured synchronization communication cycle time and the target synchronization communication cycle time; and the slave communicates excess data to another node separately from the normal data communication based on the allocated time; therefore, an effect is produced such that excess time may be efficiently used due to initiative by the slave.

In the communications control method for elevators according to the present invention having a plurality of control units including at least respective car control units and elevator hall registration control units, each of the control units having a node, the plurality of nodes being mutually connected via a network, and each of the node having a management table establishing correspondence between a node number and a network address, as explained above, the communications control method comprising the steps of: a node acting as a master when, in the case where a first network address corresponding to the node number of this node is, upon referring to the management table, a specific address in the management table, this node sends to all other nodes a broadcast communication to notify that this node is a temporary master having the first network address added thereto and receives from another temporary master a broadcast communication for notifying that this other node is the temporary master having a second network address corresponding to the node number of this other temporary master added thereto, if the first network address and the second network address conform to specific conditions; and a node acting as a slave when, in a case where the network address corresponding to the node number of this node is not a specific address in the management table or the first network address corresponding to the node number of this node is a specific address in the management table upon referring to the management table, this node sends to all other nodes a broadcast communication to notify that this node is a temporary master having the first network address added thereto and receives from another temporary master a broadcast communication for notifying that this other node is the temporary master having a second network address corresponding to the node number of this other temporary master added thereto, if the first network address and the second network address do not conform to specific conditions; therefore, a result is produced such that useless collisions of data and prolongation of time for selecting a master due to such collisions may be eliminated.

In the communications control method for elevators according to the present invention, as explained above, in the step of the node acting as the slave, the node acting as the slave acts as a quasi-master when, in a case where it does not receive synchronization start data from the node acting as the master within a predetermined amount of time and, upon referring to the management table, a third network address corresponding to its node number is a second specific address in the management table, the node sends to all other nodes a broadcast communication to notify that this node is a temporary master having the third network address added thereto and receives from another temporary master a broadcast communication for notifying that this other node is the temporary master having a fourth network address corresponding to the node number of the other temporary master added thereto, if this third and fourth network addresses conform to specific conditions; and the node acting as a slave acts as a slave once again in a case when the node references the management table and the third network address corresponding to its node number is not the second specific address in the management table and a broadcast communication is received from a node acting as the quasi-master stating this node acting as the quasi-master is the temporary master within the predetermined amount of time; therefore, an effect is produced such that transitioning of the network master may be completed speedily and without data collisions.

In the communications control method for elevators according to the present invention, as explained above, in the step of the node acting as the slave, in the case when the node acting as the slave detects that the master and the quasi-master do not exist, this node acting as the slave sends to the other nodes by means of a broadcast communication a management table rebuild request data having the management table data currently held by the node added thereto, and changes over to an operation for determining the master upon rebuilding the management table based on the management table rebuild request data received from another node; therefore an effect is produced such that a speedy transition to an alternative master and a transition to operation control per elevator car may be completed without data collisions and without wait time.

The communications control method for elevators according to the present invention, as explained above, further comprising the steps of the master sending a first synchronization start data to a first slave among a plurality of slaves; upon receiving synchronization completion data from a previous slave sending subsequent synchronization start data to a subsequent slave in sequence; upon receiving the synchronization completion data from a last slave from among the plurality of slaves completing one cycle of synchronization communication, and also, measuring the one cycle of the synchronization communication as a synchronization communication cycle time, and measuring a duration between the sending of the synchronization start data to each slave as a synchronization communication node allocated time, thus managing the communication; and each slave upon receiving the synchronization start data from the master sending data to another node; and upon completing the communication of the data communicating synchronization completion data to the master; therefore, an effect is produced such that the real time data communication at all the nodes on the network may be maintained while definitively avoiding data communication collisions to thereby perform the operation of the network with high efficiency.

In the communications control method for elevators according to the present invention, as explained above, in the step of each slave operating, each slave puts data that it needs to send into a sending buffer in advance before receiving the synchronization start data from the master; therefore, an effect is produced such that the availability of the network may be significantly improved without making the network idle.

In the communications control method for elevators according to the present invention, as explained above, in the step of the master operating, the master measures a time duration of one cycle of the synchronization communication for a particular slave, and when this measured synchronization communication cycle time is less than a target synchronization communication cycle time the master adds an allocated time to the synchronization start data in a later synchronization communication with that particular slave and communicates the same, the allocated time being a differential of the measured synchronization communication cycle time and the target synchronization communication cycle time; and wherein in the step of each slave operating, the particular slave upon receiving the synchronization start data from the master sends excess data to another node separately from the normal data communication based on the allocated time; therefore, an effect is produced such that excess time may be efficiently used due to initiative by the master.

In the communications control method for elevators according to the present invention, as explained above, in the step of each slave operating, the slave measures a time duration of one cycle of its own synchronization communication, and when this measured synchronization communication cycle time is less than a target synchronization communication cycle time the slave adds an allocated time to a synchronization response data in a later synchronization communication with the master and sends the same, the allocated time being a differential of the measured synchronization communication cycle time and the target synchronization communication cycle time; and the slave sends excess data to another node separately from the normal data communication based on the allocated time; and wherein in the step of the master operating, the master upon receiving the synchronization response data from the slave controls the synchronization communication based on the allocated time; therefore, an effect is produced such that excess time may be efficiently used due to initiative by the slave.

What is claimed is:

1. A communications control system for elevators having a plurality of control units including at least respective car control units and elevator hall registration control units, each of the plurality of control units having a node, the plurality of nodes being connected to each other via a network, and each of the nodes having a management table establishing correspondence between a node number and a network address, the communications control system comprising:

a node acting as a master when a first network address corresponding to the node number of the node is, upon referring to the management table, a specific address in the management table, and sending to all other nodes a broadcast communication to notify that the node is a temporary master having the first network address added and receiving from a second temporary master at a second node a broadcast communication notifying that the second node is a temporary master having a second network address corresponding to the node number of the second temporary master added, if the first network address and the second network address conform to specific conditions; and a node acting as a slave when the network address corresponding to the node number of the node is not a specific address in the management table, and when the first network address corresponding to the node number is a specific address in the management table, upon referring to the management table, the node sends to all other nodes a broadcast communication to notify that the node is a temporary master having the first network address added and receives from another temporary master a broadcast communication notifying that the other node is a temporary master having a second network address corresponding to the node number of the other temporary master added, if the first network address and the second network address do not conform to specific conditions.

2. The communications control system for elevators according to claim 1, wherein the node acting as the slave acts as a quasi-master when the node does not receive synchronization start data from the node acting as the master, within a predetermined amount of time, and, upon referring to the management table, a third network address corresponding to the node number of the node is a second specific address in the management table, the node sending to all other nodes a broadcast communication to notify that the node is a temporary master having the third network address added and receiving from another temporary master a broadcast communication for notifying that this other node is the temporary master having a fourth network address corresponding to the node number of the other temporary master added, if the third and, fourth network addresses conform to specific conditions; and the node acting as a slave acts as a slave again when the node references the management table and the third network address corresponding to its node number is not the second specific address in the management table and a broadcast communication is received from a node acting as the quasi-master stating this node acting as the quasi-master is the temporary master within the predetermined amount of time.

3. The communications control system for elevators according to claim 2, wherein, when the node acting as the slave detects that the master and the quasi-master do not exist, sending to the other nodes by a broadcast communication of a management table rebuild request data requesting management table data currently held by the node added, and switching to an operation for determining the master upon rebuilding the management table, based on the management table rebuild request data received from another node.

4. The communications control system for elevators according to claim 1, wherein the master sends first synchronization start data to a first slave among a plurality of slaves;

upon receiving synchronization completion data from a previous slave, sends subsequent synchronization start data to a subsequent slave in sequence;

upon receiving the synchronization completion data from a last slave, from among the plurality of slaves, completes one cycle of synchronization communication, measures the one cycle of the synchronization communication as a synchronization communication cycle time and measures duration between the sending of the synchronization start data to each slave as a synchronization communication node allocated time, thus managing the communication;

each slave, upon receiving the synchronization start data from the master, sends data to another node; and, upon completing the sending of the data, sends synchronization completion data to the master.

5. The communications control system for elevators according to claim 4, wherein each slave puts data to be sent into a sending buffer before receiving the synchronization start data from the master.

6. The communications control system for elevators according to claim 4, wherein the master measures time duration of one cycle of the synchronization communication for a particular slave, and when the measured synchronization communication cycle time is less than a target synchronization communication cycle time, the master adds an allocated time to the synchronization start data in a later synchronization communication with that particular slave and sends the synchronization start data, the allocated time being a differential of the measured synchronization communication cycle time and the target synchronization communication cycle time; and the slave, upon receiving the synchronization start data from the master, sends excess data to another node, separately from the data normally communicated, based on the allocated time.

7. The communications control system for elevators according to claim 4, wherein the slave measures time duration of one cycle of its own synchronization communication, and, when the measured synchronization communication cycle time is less than a target synchronization communication cycle time, the slave adds an allocated time to a synchronization response data in a later synchronization communication with the master and sends the synchronization response, the allocated time being a differential of the measured synchronization communication cycle time and the target synchronization communication cycle time;

the slave sends excess data to another node separately from the normal data communication and based on the allocated time; and the master, upon receiving the synchronization response data from the slave, controls the synchronization communication based on the allocated time.

8. A communications control system for elevators having a plurality of control units including at least respective car control units and elevator hall registration control units, each of the plurality of control units having a node, the plurality of nodes being mutually connected via a network as a single master and a plurality of slaves, and each node having a management table establishing correspondence between a node number and a network address wherein the master sends a first synchronization start data to a first slave among a plurality of slaves;

upon receiving synchronization completion data from a previous slave, the slave sends subsequent synchronization start data to a subsequent slave, in sequence;

upon receiving the synchronization completion data from a last slave from among the plurality of slaves, completes one cycle of synchronization communication, and measures the one cycle of the synchronization communication as a synchronization communication cycle time, and measures duration between sending of the synchronization start data to each slave as a synchronization communication node allocated time, thus managing the communication;

each slave, upon receiving the synchronization start data from the master, sends data to another node; and upon completing sending of the data, sends synchronization completion data to the master.

9. The communications control system for elevators according to claim 8, wherein each slave puts data to be sent into a sending buffer before receiving the synchronization start data from the master.

10. The communications control system for elevators according to claim 8, wherein the master measures time duration of one cycle of the synchronization communication for a particular slave, and when the measured synchronization communication cycle time is less than a target synchronization communication cycle time, the master adds an allocated time to the synchronization start data in a later synchronization communication with that particular slave and sends the synchronization start data the allocated time being a differential of the measured synchronization communication cycle time and the target synchronization communication cycle time; and the slave, upon receiving the synchronization start data from the master, sends excess data to another node, separately from the data normally communicated, based on the allocated time.

11. The communications control system for elevators according to claim 8, wherein the slave measures time duration of one cycle of its own synchronization communication, and, when this measured synchronization communication cycle time is less than a target synchronization communication cycle time, the slave adds an allocated time to a synchronization response data in a later synchronization communication with the master and sends the synchronization response, the allocated time being a differential of the measured synchronization communication cycle time and the target synchronization communication cycle time;

the slave sends excess data to another node separately from the normal data communication and based on the allocated time; and the master, upon receiving the synchronization response data from the slave, controls the synchronization communication based on the allocated time.

12. A communications control method for elevators having a plurality of control units including at least respective car control units and elevator hall registration control units, each of the plurality of control units having a node, the plurality of nodes being mutually connected via a network, and each of the nodes having a management table establishing correspondence between a node number and a network address, the communications control method comprising:

a node acting as a slave when the network address corresponding to the node number of the node is not a specific address in the management table, and, when the first network address corresponding to the node number is a specific address in the management table, upon referring to the management table, the node sends to all other nodes a broadcast communication to notify that the node is a temporary master having the first network address added and receives from another temporary master a broadcast communication notifying that the other node is a temporary master having a second network address corresponding to the node number of this other temporary master added, if the first network address and the second network address do not conform to specific conditions.

13. The communications control method for elevators according to claim 12, wherein the node acting as the slave acts as a quasi-master when the node does not receive synchronization start data from the node acting as the master, within a predetermined amount of time, and, upon referring to the management table, a third network address corresponding to the node number of the node is a second specific address in the management table, the node sends to all other nodes a broadcast communication to notify that this node is a temporary master having the third network address added and receives from another temporary master a broadcast communication notifying that this other node is the temporary master having a fourth network address corresponding to the node number of the other temporary master added, if the third and, fourth network addresses conform to specific conditions; and the node acting as a slave acts as a slave again when the node references the management table and the third network address corresponding to its node number is not the second specific address in the management table and a broadcast communication is received from a node acting as the quasi-master stating this node acting as the quasi-master is the temporary master within the predetermined amount of time.

14. A communications control method for elevators according to claim 13, when the node acting as the slave detects that the master and the quasi-master do not exist, sending to the other nodes by a broadcast communication of a management table rebuild request data requesting management table data currently held by the node added, and switches to an operation for determining the master upon rebuilding the management table, based on the management table rebuild request data received from another node.

15. The communications control method for elevators according to claim 12, further comprising:

the master sending first synchronization start data to a first slave among a plurality of slaves;

upon receiving synchronization completion data from a previous slave, sending subsequent synchronization start data to a subsequent slave in sequence;

upon receiving the synchronization completing data from a last slave from among the plurality of slaves, completing one cycle of synchronization communication, measuring the one cycle of the synchronization communication as a synchronization communication cycle time, and measuring duration between the sending of the synchronization start data to each slave as a synchronization communication node allocated time, thus managing the communication;

each slave, upon receiving the synchronization start data from the master sending data to another node; and upon completing the sending of the data, communicating synchronization completion data to the master.

16. The communications control method for elevators according to claim 15, wherein each slave puts data to be sent into a sending buffer before receiving the synchronization start data from the master.

17. The communications control method for elevators according to claim 15, wherein the master measures time duration of one cycle of the synchronization communication for a particular slave, and when this measured synchronization communication cycle time is less than a target synchronization communication cycle time, the master adds an allocated time to the synchronization start data in a later synchronization communication with that particular slave and sends the synchronization data, the allocated time being a differential of the measured synchronization communication cycle time and the target synchronization communication cycle time; and the particular slave, upon receiving the synchronization start data from the master, sends excess data to another node separately from the data normally communicated, based on the allocated time.

18. The communications control method for elevators according to claim 15, wherein the slave measures time duration of one cycle of its own synchronization communication, and, when this measured synchronization communication cycle time is less than a target synchronization communication cycle time, the slave adds an allocated time to a synchronization response data in a later synchronization communication with the master and sends the synchronization response, the allocated time being a differential of the measured synchronization communication cycle time and the target synchronization communication cycle time;

the slave sends excess data to another node separately from the normal data communication and based on the allocated time; and the master, upon receiving the synchronization response data from the slave, controls the synchronization communication based on the allocated time.

* * * * *